US008954709B2

United States Patent
Nishiguchi et al.

(10) Patent No.: US 8,954,709 B2
(45) Date of Patent: Feb. 10, 2015

(54) MEMORY MANAGEMENT APPARATUS, MEMORY MANAGEMENT METHOD AND NON-TRANSITORY COMPUTER READABLE STORAGE MEDIUM

(75) Inventors: Naoki Nishiguchi, Kawasaki (JP); Noboru Iwamatsu, Kawasaki (JP); Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 812 days.

(21) Appl. No.: 12/929,943

(22) Filed: Feb. 25, 2011

(65) Prior Publication Data
US 2011/0238947 A1     Sep. 29, 2011

(30) Foreign Application Priority Data

Mar. 24, 2010   (JP) .................................. 2010-068704

(51) Int. Cl.
*G06F 12/10*         (2006.01)
(52) U.S. Cl.
CPC .................................. *G06F 12/1036* (2013.01)
USPC .................................. 711/207; 711/E12.061
(58) Field of Classification Search
None
See application file for complete search history.

(56) References Cited

U.S. PATENT DOCUMENTS

| 5,295,251 | A  |   | 3/1994  | Wakui et al. |            |
|-----------|----|---|---------|--------------|------------|
| 6,260,130 | B1 | * | 7/2001  | Liedtke      | 711/206    |
| 7,823,151 | B2 | * | 10/2010 | Seth et al.  | 718/1      |
| 8,031,634 | B1 | * | 10/2011 | Artzi et al. | 370/254    |
| 2006/0288189 | A1 | * | 12/2006 | Seth et al. | 711/207    |
| 2009/0164991 | A1 |   | 6/2009  | Takashige et al. | |

FOREIGN PATENT DOCUMENTS

| JP | 05-035597    | 2/1993 |
| JP | 2825550      | 9/1998 |
| JP | 2009-151650  | 7/2009 |

* cited by examiner

*Primary Examiner* — Charles Rones
*Assistant Examiner* — Ryan Dare
(74) *Attorney, Agent, or Firm* — Staas & Halsey LLP

(57) ABSTRACT

A memory management apparatus has an ASID conversion table, an actual ASID use table, and a TLB flush control section. The ASID conversion table and the actual ASID use table manage virtual ASID, actual ASID and an overlap flag so that they are related for each VM. The TLB flush control section reads actual ASIDs allocated to VM as a switching target at the time of switching VM as a switching source into the VM as the switching target, determines whether the read actual ASID is allocated to the plurality of VMs in an overlapped manner with reference to the overlap flag, and sets the actual ASID in the read actual ASIDs determined being allocated in the overlapped manner as a target for the TLB flush.

11 Claims, 16 Drawing Sheets

FIG.4

| VMID | VIRTUAL DOMAIN | ACTUAL DOMAIN | ACCESS SETTING | OVERLAP FLAG | TLB NECESSITY FLAG | IN-USE FLAG | GLOBAL FLAG | LOCAL FLAG |
|---|---|---|---|---|---|---|---|---|
| 47A | 47B | 47C | 47D | 47E | 47F | 47G | 47H | 47I |

MEMORY MANAGEMENT APPARATUS, MEMORY MANAGEMENT METHOD AND NON-TRANSITORY COMPUTER READABLE STORAGE MEDIUM

CROSS-REFERENCE TO RELATED APPLICATION

This application is based upon and claims the benefit of priority of the prior Japanese Patent Application No. 2010-068704, filed on Mar. 24, 2010, the entire contents of which are incorporated herein by reference.

FIELD

The embodiment discussed herein is directed to a memory management apparatus, a memory management method and a non-transitory computer readable storage medium.

BACKGROUND

Performance of central processing units (hereinafter, CPU) to be used in embedded devices (for example, mobile telephones) is improved, and thus a plurality of operating systems (hereinafter, OS) can be operated by means of virtualization on same CPU. In such devices, not CPUs with virtualization supports such as CPUs for personal computers or servers but CPUs specialized for embedding are used. That is to say, in the embedded devices, the performance can be virtualized but the virtualization of the functions needs the virtualization supports by software.

When OSs are not in the virtualized environment, a control for eliminating TLB (Translation Lookaside Buffer) flush is made. If each virtualized OS (guest OS) performs no operations in TLB flush at the time of virtualization, this control does not function effectively in switching between the guest OSs. As a result, TLB flush increases more than the case where the OSs are not virtualized.

For example, a global region of a virtual memory to be used as an OS kernel region might be normally present in the same virtual address in each guest OS. Due to ASID (Address Space Identifier) that enables a memory map of each process to be cached as a TLB entry, the TLB flush is not necessary for switching between the processes in the guests. In the switching between the guests, however, when ASID is overlapped, the TLB flush is necessary.

Since the ASIDs are used in relation to process IDs, the ASIDs are used sequentially from 0 in OSs, and thus they are highly likely overlapped between the guests. Further, due to domains where memory regions are classified and an access can be protected, kernel regions and user regions are separated so that the access control is made based on the domains in each OS.

When a domain is overlapped, and if the region of the domain is global, or the region is local and ASID is identical, the TLB flush is necessary for the switching between the guests. Particularly the global regions mostly have the same domain.

It is considered that the control is changed on the assumption that a plurality of guest OSs is present. For example when a maximum number of ASIDs treated by the guest is limited, a number of processes treated by the OSs is limited, thereby influencing a design of OSs. That is to say, it seems to be very difficult to suitably change the control of guest OSs.

In order that a use method of ASID in guest OS is not changed, Japanese Laid-open Patent Publication No. 2009-151650, Japanese Patent No. 2825550, and Japanese Laid-open Patent Publication No. 05-035597 discuss the following methods. In these methods, a correspondence table between ASIDs to be used by guest OSs and actual ASIDs is prepared, and a control is made so that the guest OS freely use the ASID but the actual ASID is not overlapped.

However, in the conventional techniques, it is difficult for the TLB flush in global regions to be reduced.

In the conventional techniques, TLB entry is managed so that actually used ASIDs are accurately recognized and free ASIDs are collected, so the ASIDs are prevented from being used in an overlapped manner. However, since the management of the TLB entry is a process with very heavy load, the reduction in the TLB flush becomes less important. That is to say, since it is difficult for the TLB entry to be managed in an actual environment, it is difficult for free ASIDs to be collected, and thus the ASIDs may be used in an overlapped manner. It appears to be a reality that it is difficult for the conventional technique to cope with such a circumstance.

SUMMARY

According to an aspect of an embodiment of the invention, a memory management apparatus includes a region identification information management section for relating virtual region identification information for identifying a region in a memory to be allocated for a program executed in a virtualized environment to actual region identification information for identifying a region in a memory to be allocated for a virtualized environment where the program is executed in each virtualized environment so as to manage these information; an overlap determining section for determining whether the actual region identification information is allocated for a plurality of virtualized environments in an overlapped manner; an overlap region management section for, when the overlap determining section determines that the actual region identification information is allocated for the plurality of virtualized environments in the overlapped manner, managing overlap information representing overlap with the overlap information being related to the actual region identification information; and a TLB control section for, when a virtualized environment as a switching source to which execution time is allocated is switched into a virtualized environment as a switching target, reading the actual region identification information allocated for the virtualized environment of the switching target from the region identification information management section, determining whether the read actual region identification information is allocated for the plurality of virtualized environments in the overlapped manner with reference to the overlap information, and setting actual region identification information in the read actual region identification information determined as being allocated in the overlap manner as a target for a TLB process.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is an explanatory diagram illustrating one example of entry contents of a domain conversion table;

DESCRIPTION OF EMBODIMENTS

Preferred embodiments of the present invention will be explained with reference to accompanying drawings. The disclosed technique is not limited to the embodiments.

[a] First Embodiment

Figure 1:
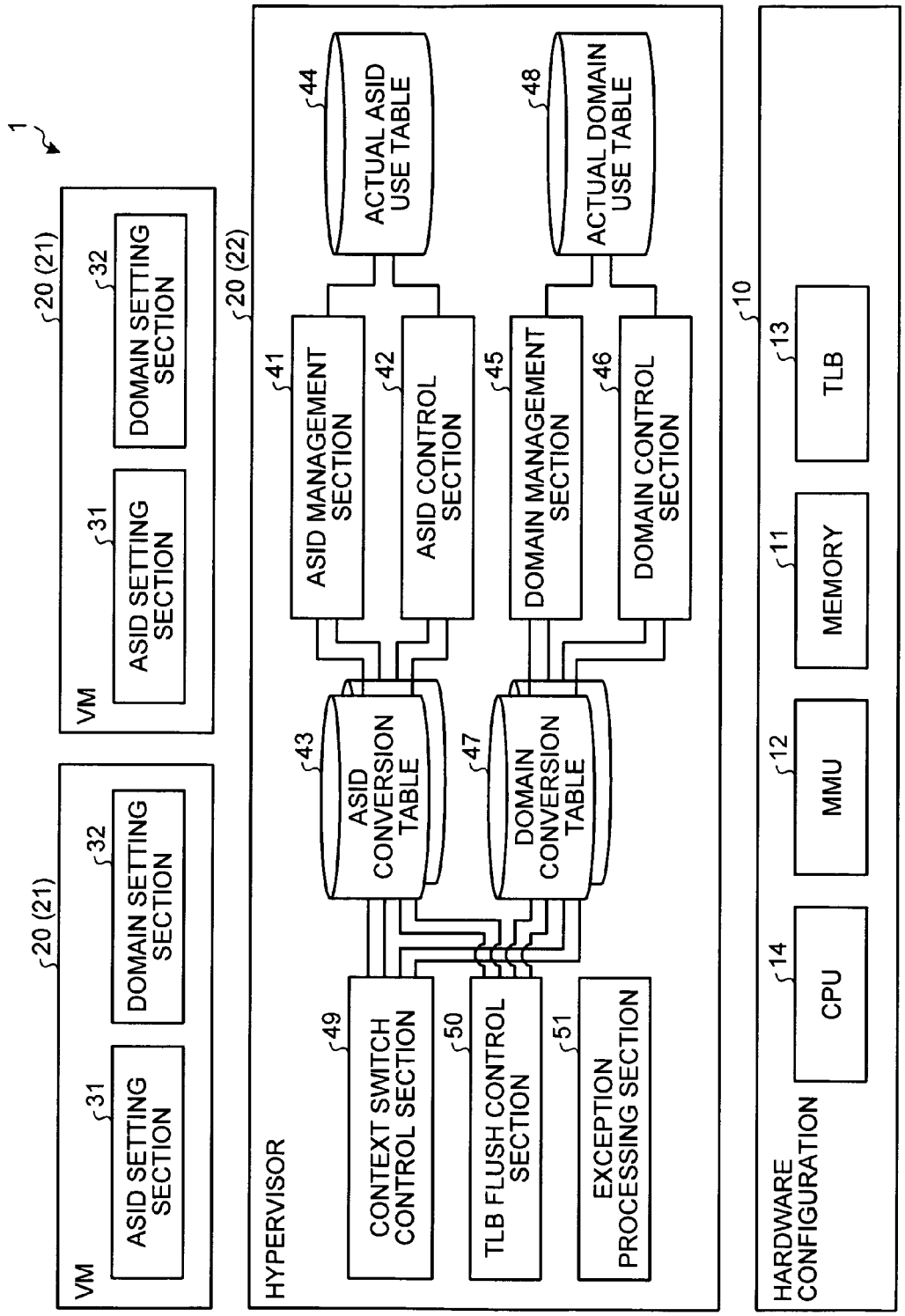
FIG. 1 is an explanatory diagram illustrating hardware and software configurations of a memory management apparatus.

FIG. 1 is an explanatory diagram illustrating hardware and software configurations of the memory management apparatus. A memory management apparatus 1 illustrated in FIG. 1 has a hardware configuration 10 including a memory 11, a memory management unit (hereinafter, MMU) 12, a TLB 13 and a CPU 14. The CPU 14 executes instructions and generates exception. The MMU 12 corresponds to a part that sets ASID and domain access, and realizes an access to the memory 11 based on the setting. At this time, the MMU 12 refers to a page table via the memory 11 or the TLB 13. Further, a flush of the TLB 13 is performed by the MMU 12. Software such as hypervisor and VM are retained in the memory 11 and are executed by the CPU 14, and the CPU 14 accesses to the memory 11 via the MMU 12.

The memory management apparatus 1 has a software configuration 20 including a plurality of virtual machines (hereinafter, VM) 21 where guest OSs operate in a virtualized environment, and a hypervisor 22 that manages the plurality of VMs 21.

The VM 21 has an ASID setting section 31 and a domain setting section 32. The ASID setting section 31 notifies the hypervisor 22 about virtual ASID set for a process managed by the OS on the VM 21. The domain setting section 32 notifies the hypervisor 22 about a domain access setting and a change of a page table entry composing a virtual address space managed by the OS on the VM 21.

Two kinds of the VMs 21 are present. One is for full-virtualization that can directly operate OS without modifying the OS, and the other is for para-virtualization that can operate OS by modifying a privilege instruction to calling to the hypervisor 22, namely, hyper call. Two kinds of methods for notifying the hypervisor 22 from the VM 21 are present for the full-virtualization and the para-virtualization. In the case of the VM 21 for the full-virtualization, when the privilege instruction is executed in the VM 21, the CPU 14 generates exception, and thus the notifying the hypervisor 22 is enabled by the exception. In the case of the VM 21 for the para-virtualization, the notifying the hypervisor 22 is carried out using hyper call. The hyper call is realized by utilizing a function of the CPU 14 such as software interruption. Also in the case of the full-virtualization, the notification is enabled by the hyper call. An request is transmitted from the VM 21 to the hypervisor 22 by utilizing these notification functions.

Figure 2:
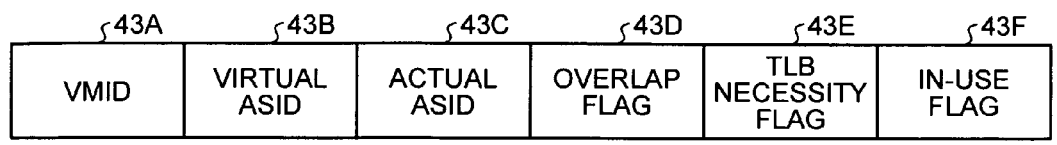
FIG. 2 is an explanatory diagram illustrating one example of entry contents of an ASID conversion table.

The hypervisor 22 has an ASID management section 41, an ASID control section 42, an ASID conversion table 43 and an actual ASID use table 44. FIG. 2 is an explanatory diagram illustrating one example of entry contents of the ASID conversion table 43. The ASID conversion table 43 is prepared for each VM 21, and is a correspondence table between virtual ASIDs of the VMs 21 and actual ASIDs set in the MMU 12. The entry contents of the ASID conversion table 43 illustrated in FIG. 2 include a VMID 43A, a virtual ASID 43B, an actual ASID 43C, an overlap flag 43D, a TLB necessity flag 43E and an in-use flag 43F.

The VMID 43A corresponds to an ID for uniquely identifying the VM 21. The virtual ASID 43B is address space identification information for identifying a virtual address space of each process to be executed by OS operating on the VM 21. The actual ASID 43C can specify 0 to 255, for example, in the case of an ARM processor. The overlap flag 43D corresponds to a flag that represents whether a plurality of processes of virtual ASIDs for which a target actual ASID is being allocated in an overlapped manner is present, namely, "present" or "non-present". The TLB necessity flag 43E corresponds to a flag that represents whether a TLB flush is necessary at the time of switching to a target process, namely, "necessary" or "unnecessary". When the target VM 21 performs the TLB flush, the TLB necessity flag 43E sets the TLB flush to "unnecessary".

The in-use flag 43F corresponds to a flag that represents whether the process of the virtual ASID is currently used in OS of the target VM 21, namely, "in use" or "non-use". The actual ASID 43C may be substituted for the in-use flag 43F by setting an ineffective value to the actual ASID 43C. In the ASID conversion table 43, table regions whose number is the same as the maximum number of the virtual ASIDs may be prepared in advance, and in this case, the maximum number of table regions may be secured, but working efficiency at the time of searching for the virtual ASID is improved. Further, only effective virtual ASID may be added to the ASID conversion table 43.

Figure 3:
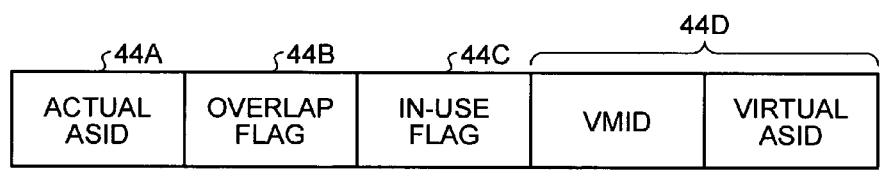
FIG. 3 is an explanatory diagram illustrating one example of entry contents of an actual ASID use table.

FIG. 3 is an explanatory diagram illustrating one example of entry contents of the actual ASID use table 44. The actual ASID use table 44 manages a use condition of the actual ASIDs. The entry contents in the actual ASID use table 44 illustrated in FIG. 3 include an actual ASID 44A, an overlap flag 44B, an in-use flag 44C, and an overlapped-use virtual machine list 44D. The overlap flag 448 corresponds to a flag that represents whether a process of a virtual ASID to which an actual ASID is allocated in an overlapped manner is present, namely, "present" or "non-present". The in-use flag 44C corresponds to a flag that represents whether the actual ASID is in use, namely, "in-use" or "non-use". The overlapped-use virtual machine list 44D manages a plurality of a set of VMID using the actual ASID and virtual ASID converted to the actual ASID.

The ASID management section 41 receives requests of ASID allocation and ASID deletion from the VM 21 so as to update contents of the ASID conversion table 43 of the VM 21 and the actual ASID use table 44, and delete the ASID conversion table 43 corresponding to the VM 21 at the time of end of VM.

The ASID control section 42 converts virtual ASID into actual ASID, and sets the actual ASID to the MMU 12. The ASID control section 42 acquires entry from the ASID conversion table 43 using VMID and virtual ASID as keys. When the overlap flag 43D of the entry indicates "present", the ASID control section 42 determines that the virtual ASID is overlapped. Further, the ASID control section 42 acquires the virtual machine list 44D of the VMID and the virtual ASID from the actual ASID use table 44 using the actual ASID of this entry as a key. Further, the ASID control section 42 acquires entry from the ASID conversion table 43 for this list, and changes the TLB necessity flag 43E of this entry into "necessary".

The hypervisor 22 has a domain management section 45, a domain control section 46, a domain conversion table 47 and an actual domain use table 48. FIG. 4 is an explanatory diagram illustrating one example of entry contents of the domain conversion table 47. The domain conversion table 47 is provided for each VM 21, and represents a correspondence relationship between a virtual domain of the VM 21 and an actual domain to be set in the MMU 12. The domain conversion table 47 illustrated in FIG. 4 includes a VMID 47A, a virtual domain 47B, an actual domain 47C, an access setting 47D, an overlap flag 47E, a TLB necessity flag 47F, an in-use flag 47G, a global flag 47H and a local flag 47I.

The VMID 47A corresponds to an ID for uniquely identifying the VM 21. The VMID 47A can be omitted when the domain conversion table 47 be retained for each VM 21. The virtual domain 47B corresponds to a domain to be used by OS of the VM 21. In the case of the ARM processor, 0 to 15 can be specified as the virtual domain 47B. The actual domain 47C corresponds to a domain to be set in the hardware. Differently from ASID, different virtual domains in one VM 21 are not related to the same actual domains. The access setting 47D manages setting contents of an access authority to a memory region corresponding to an actual domain corresponding to the virtual domain 47B. The access authority includes accessibility, unaccessiblility, and setting according to a page table entry flag.

The overlap flag 47E corresponds to a flag that represents whether a plurality of virtual domains to which actual domain is allocated in an overlapped manner is present, namely, "present" or "non-present". The TLB necessity flag 47F corresponds to a flag that represents whether the TLB flush is necessary at the time of switching into the process on the VM 21, namely, "necessary" or "unnecessary". When the TLB flush is executed on the VM 21, the TLB necessity flag 47F is set to "unnecessary". The in-use flag 47G corresponds to a flag that represents whether virtual domain is being currently used by OS of the VM 21, namely, "in-use" or "non-use". The actual domain 47C may be substituted for the in-use flag 47G by setting an ineffective value to the actual domain 47C.

The global flag 47H is set when a virtual domain is used as a global region, and the local flag 47I is set when a virtual domain is used as a local region. As to whether a virtual domain is used as the global region or the local region, a flag is present in the page table entry, and in the case of the global region, caching to the TLB 13 is performed regardless of ASID. Information to be cached into the TLB 13 corresponds to a group of a virtual address, a page size, a physical address and flags in a page table entry. In the case of the local region, caching to the TLB 13 is performed in relation with ASID. At this time, information to be cached to the TLB 13 corresponds to a group of a virtual address, a page size, a physical address and flags in a page table entry flag, and ASID.

In the domain conversion table 47, table regions whose number is the same as the maximum number of the virtual domains may be prepared in advance, and in this case, the maximum number of table regions may be secured, but working efficiency at the time of searching for the virtual domain is improved. In the domain conversion table 47, only effective virtual domains may be added as a list.

Figure 5:
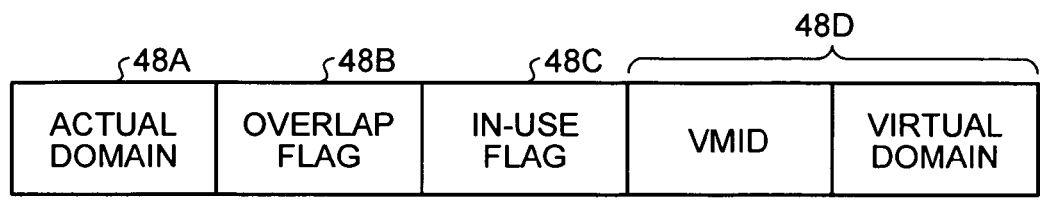
FIG. 5 is an explanatory diagram illustrating one example of entry contents of an actual domain use table.

FIG. 5 is an explanatory diagram illustrating one example of entry contents of the actual domain use table 48. The actual domain use table 48 manages a use condition of actual domains. The entry contents of the actual domain use table 48 illustrated in FIG. 5 include an actual domain 48A, an overlap flag 48B, an in-use flag 48C, and an overlapped-use virtual machine list 48D. The overlap flag 48B corresponds to a flag that represents whether a virtual domain to which an actual domain is allocated in an overlapped manner is present, namely, "present" or "non-present". The in-use flag 48C corresponds to a flag that represents whether the actual domain is in use, namely, "in-use" or "non-use". The overlapped-use virtual machine list 48D manages a plurality of a set of VMID using the actual domain and the virtual domain converted to the actual domain.

The domain management section 45 receives a domain allocating request, a domain deleting request, a domain access setting request and a page table entry setting request from the VM 21, and updates contents of the domain conversion table 47 of this VM 21 and the actual domain use table 48. Further, the domain management section 45 deletes the domain conversion table 47 corresponding to the VM 21 at the time of ending the VM 21.

The domain control section 46 structures domain access setting based on the domain conversion table 47 of the VM 21, and sets the domain access setting in the MMU 12. The domain control section 46 acquires an entry from the domain conversion table 47 using the VMID 47A and the virtual domain 47B as keys, and when the overlap flag 47E of the entry indicates "present", determines that the virtual domain is overlapped. Further, the domain control section 46 acquires the virtual machine list 48D of the VMID and the virtual domain from the actual domain use table 48 using the actual domain of this entry as a key. The domain control section 46 further acquires an entry from the domain conversion table 47 for the virtual machine list 48D, and changes the TLB necessity flag 47F of this entry into "necessary".

The hypervisor 22 has a context switch control section 49, a TLB flush control section 50, and an exception processing section 51.

The context switch control section 49 performs context switch such as switching between the VMs 21 and switching between processes in one VM 21. The context switch control section 49 requests the TLB flush control section 50 to execute a TLB flush control process. The context switch control section 49 further requests the ASID control section 42 to execute a virtual ASID switching process, and requests the domain control section 46 to execute the domain access setting process. Thereafter, the context switch control section 49 executes context switching processes such as replacement of registers of the CPU 14 and replacement of the page table.

The TLB flush control section 50 determines whether the TLB flush is necessary in the TLB flush control process.

When necessary, the TLB flush control section 50 issues a TLB flush command to the MMU 12. The exception processing section 51 processes exception generated by the CPU 14.

Figure 6:
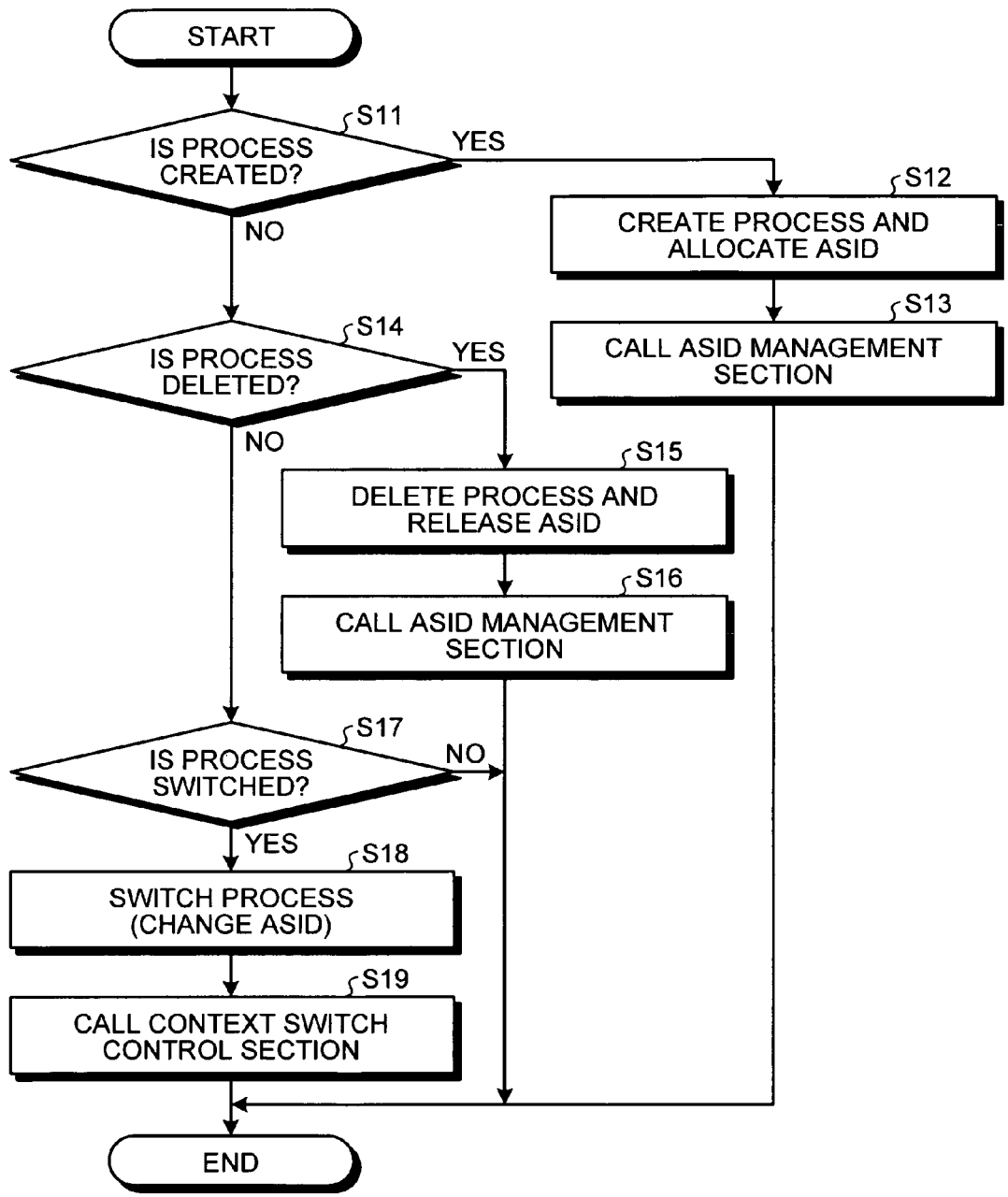
FIG. 6 is a flowchart illustrating a processing operation in an ASID setting section.

An operation of the memory management apparatus 1 according to the first embodiment is described below. FIG. 6 is a flowchart illustrating a processing operation of the ASID setting section 31. The ASID setting section 31 interfaces with process management to be performed by the OS operating on the VM 21, and notifies the hypervisor 22 about process management. The process management includes process creation, process deletion, process switching and the like.

The ASID setting section 31 illustrated in FIG. 6 determines whether a process is created (step S11). When the process is created (YES at step S11), the ASID setting section 31 allocates a new virtual ASID to the process (step S12). Further, the ASID setting section 31 calls the ASID management section 41 of the hypervisor 22 (step S13) so as to notify about the allocation of the virtual ASID, and ends the processing operation.

When the process is not created (NO at step S11), the ASID setting section 31 determines whether the process is deleted (step S14). When the process is deleted (YES at step S14), the ASID setting section 31 releases the virtual ASID (step S15). The ASID setting section 31 calls the ASID management section 41 of the hypervisor 22 (step S16) so as to notify about the deletion of the virtual ASID, and ends the processing operation.

When the process is not deleted (NO at step S14), the ASID setting section 31 determines whether the process is switched (step S17). When the process is switched (YES at step S17), the ASID setting section 31 executes a process switching process, and acquires a virtual ASID corresponding to a process of a switching target (step S18). Further, the ASID setting section 31 calls the context switch control section 49 of the hypervisor 22 (step S19) so as to notify about the virtual ASID of the process of the switching target, and ends the processing operation. When the process is not switched (NO at step S17), the ASID setting section 31 ends the processing operation.

Figure 7:
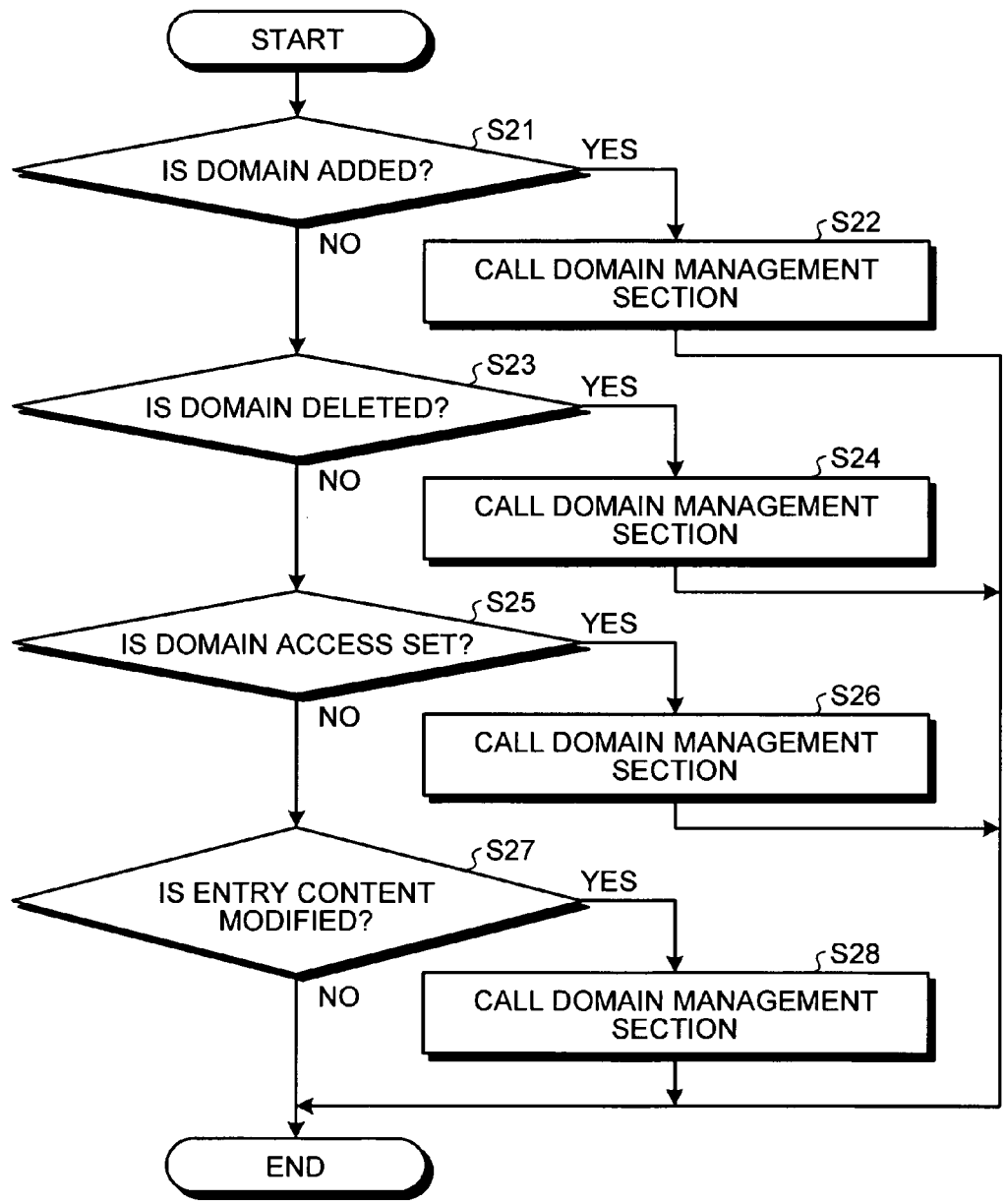
FIG. 7 is a flowchart illustrating a processing operation in a domain setting section.

FIG. 7 is a flowchart illustrating a processing operation of the domain setting section 32. The domain setting section 32 interfaces with processing for creating a page table for a virtual address space created for each process and processing for setting a domain access, and notifies the hypervisor 22 about these processing. The virtual domain is set as a domain number into the entry of the page table. The address space to be accessed by the page table belongs to that domain. The domain access setting is for setting an access right for each domain number, and thus access rights includes unaccessibility, accessibility, and setting according to a page table entry flag.

The domain setting section 32 in FIG. 7 determines whether a new virtual domain is added (step S21). When a new virtual domain is added (YES at step S21), the domain setting section 32 calls the domain management section 45 of the hypervisor 22 (step S22) so as to notify about a domain number of the virtual domain to be added, and ends the processing operation. The domain setting section 32 can specify whether the virtual domain is used for one or both of the global region and local region.

When a virtual domain is not added (NO at step S21), the domain setting section 32 determines whether a virtual domain that is not used is deleted (step S23). When the virtual domain that is not used is deleted (YES at step S23), the domain setting section 32 calls the domain management section 45 of the hypervisor 22 (step S24) in order to notify about a domain number of the virtual domain to be deleted, and ends the processing operation.

When the virtual domain is not deleted (NO at step S23), the domain setting section 32 determines whether a domain access is set (step S25). When the domain access is set (YES at step S25), the domain setting section 32 calls the domain management section 45 of the hypervisor 22 (step S26) in order to notify about the setting of the domain access, and ends the processing operation.

When the domain access is not set (NO at step S25), the domain setting section 32 determines whether entry content in the page table is modified (step S27). When the entry content in the page table is modified (YES at step S27), the domain setting section 32 calls the domain management section 45 of the hypervisor 22 (step S28) in order to notify about the entry content, and ends the processing operation.

Further, when the entry content in the page table is not modified (NO at step S27), the domain setting section 32 ends the processing operation.

The above description is such that the hypervisor 22 is notified about the addition and deletion of a virtual domain by the domain setting section 32, but the hypervisor 22 may extract a domain number from the page table entry and automatically add a virtual domain to be used. Further, the global flag of the page table entry is checked so that a determination can be made whether a virtual domain is used in the global region or the local region. For this reason, a method with which the addition and deletion of a virtual domain are not performed by the domain setting section 32 can be used.

Figure 8:
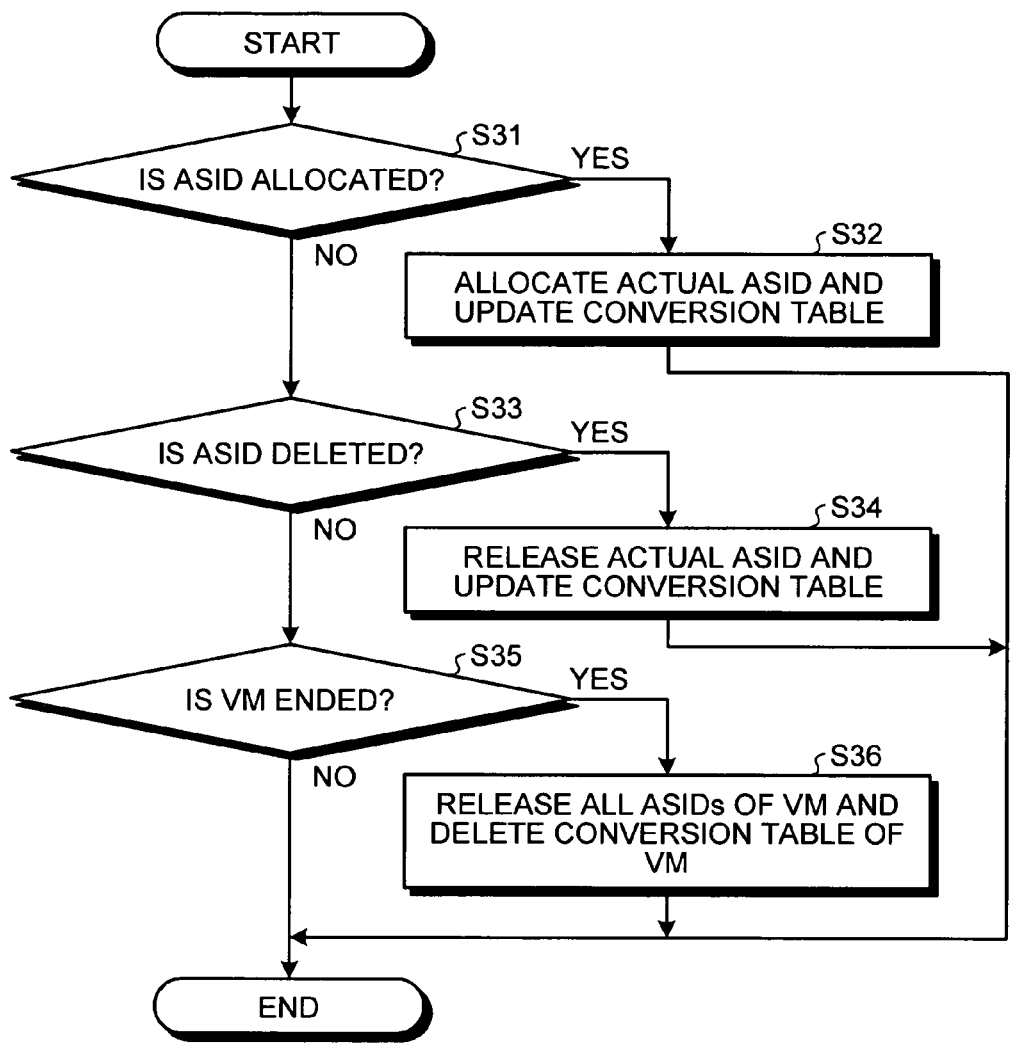
FIG. 8 is a flowchart illustrating a processing operation in an ASID management section.

FIG. 8 is a flowchart illustrating a processing operation of the ASID management section 41. The ASID management section 41 is called by the ASID setting section 31 of the VM 21, or when the VM 21 ends the process, the ASID management section 41 is activated according to a calling operation from a VM management section, not illustrated. The VM management section is arranged in the hypervisor 22, and manages creation and ending of the VM 21 and switching of the VM 21. The switching of the VM 21 means that when a plurality of VMs 21 is present, the VM management section selects the VM 21 that should occupy the CPU 14, namely, a scheduler.

In FIG. 8, the ASID management section 41 determines whether allocation of a new virtual ASID is requested from the ASID setting section 31 of the VM 21 (step S31). When the allocation of the new virtual ASID is requested (YES at step S31), the ASID management section 41 refers to entry contents in the actual ASID use table 44, and allocates an actual ASID that should correspond to the new virtual ASID, and updates the ASID conversion table 43 corresponding to the virtual ASID (step S32) so as to end the processing operation. The ASID management section 41 refers to entry contents in the actual ASID use table 44, and allocates an actual ASID that is not used if possible. Then, the ASID management section 41 sets the in-use flags of actual ASID in the actual ASID use table 44 and the ASID conversion table 43 to "in use". The ASID management section 41 further adds the virtual machine list (VMID and virtual ASID) 44D corresponding to the actual ASID in the actual ASID use table 44.

When all actual ASIDs are "in use", the ASID management section 41 may allocate a non-overlapped actual ASID, an actual ASID that is not used by the same VM 21, and an actual ASID whose TLB necessity flag indicates "unnecessary". When the allocated actual ASID is overlapped, the ASID management section 41 sets the overlap flag 44B of the actual ASID of the actual ASID use table 44 to "present", and the overlap flag 43D of the actual ASID of the ASID conversion table 43 to "present". When the TLB necessity flag 43E of virtual ASIDs other than the new virtual ASID of the actual ASID of the ASID conversion table 43 indicates "necessary", the ASID management section 41 sets the TLB necessity flag 43E of the new virtual ASID in the ASID conversion table 43to "necessary".

When the allocation of a new virtual ASID is not requested (NO at step S31), the ASID management section 41 determines whether deletion of a virtual ASID is requested (step S33). When the deletion of a virtual ASID is requested (YES at step S33), the ASID management section 41 refers to the entry contents in the ASID conversion table 43, and releases the entry corresponding to the deleted virtual ASID (step S34). Further, the ASID management section 41 updates the actual ASID use table 43 corresponding to the virtual ASID (step S34), and ends the processing operation.

The ASID management section 41 sets an actual ASID of the ASID conversion table 43 corresponding to the deleted virtual ASID to an invalid value, and cancels the setting of the in-use flag 43F (non-use). The ASID management section 41 deletes combinations of VMID and virtual ASID of entry of the actual ASID corresponding to the deleted virtual ASID in the actual ASID use table 44, and when the number of a residual combination is one, cancels the setting of the overlap flag 44B (none). When the number of a residual combination is one, the ASID management section 41 cancels the setting of the overlap flag 43D of the virtual ASID in the ASID conversion table 43 corresponding to this combination (none).

When the deletion of a virtual ASID is not requested (NO at step S33), the ASID management section 41 determines whether the end of the VM is requested from the VM management section (step S35). When the end of the VM is requested (YES at step S35), the ASID management section 41 releases all virtual ASIDs used by this VM 21 (step S36). The ASID management section 41 deletes the ASID conversion table 43 that manages all the virtual ASIDs used by this VM 21 (step S36), and ends the processing operation. When the end of the VM is not requested (NO at step S35), the ASID management section 41 ends the processing operation.

Figure 9:
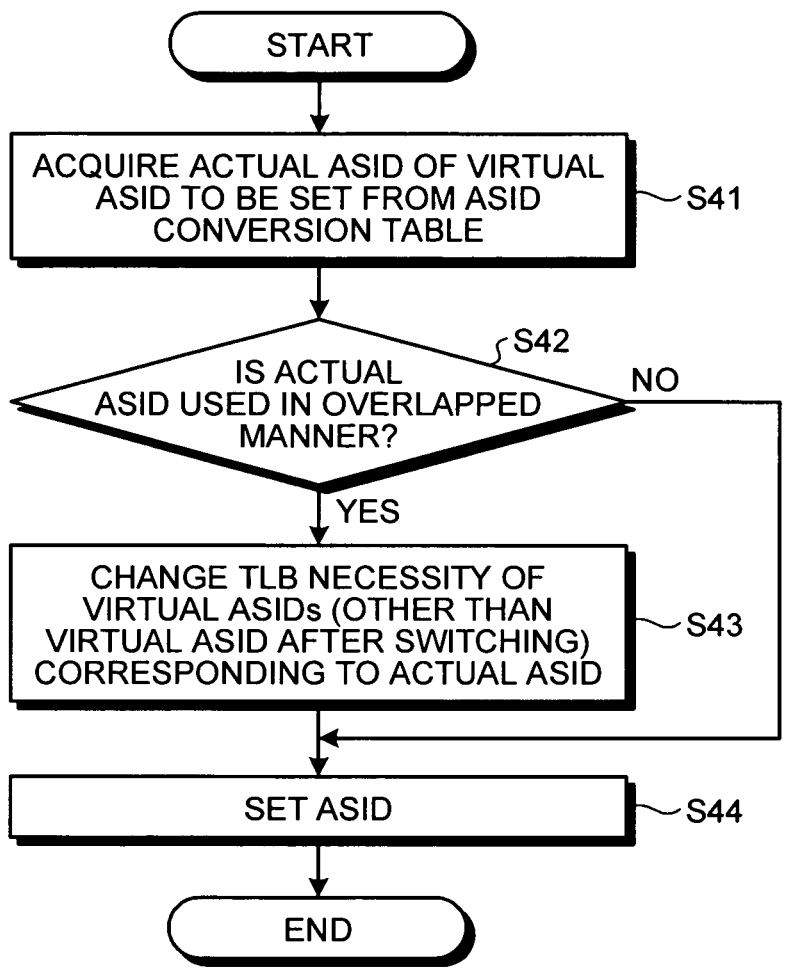
FIG. 9 is a flowchart illustrating a processing operation in an ASID control section.

FIG. 9 is a flowchart illustrating a processing operation of the ASID control section 42. When the ASID control section 42 is called by the context switch control section 49, virtual ASID specified as a setting target and VMID representing the VM 21 using this virtual ASID are transmitted to the ASID control section 42 from the context switch control section 49.

In FIG. 9, when the ASID control section 42 is called by the context switch control section 49, the ASID control section 42 acquires actual ASID corresponding to virtual ASID specified as a setting target from the entry of the ASID conversion table 43 (step S41). The ASID control section 42 determines based on the overlap flag 43D of the actual ASID whether the actual ASID is used in an overlapped manner (step S42). When the actual ASID is used in the overlapped manner (YES at step S42), the ASID control section 42 searches for VMID and virtual ASID in the overlapped-use virtual machine list 44D corresponding to the actual ASID registered in the actual ASID use table 44. The ASID control section 42 further acquires entries (ASID conversion informations) registered in the ASID conversion table 43 for a combination of a VMID and a virtual ASID different from the target VMID and the target virtual ASID in the virtual machine list 44D. When acquiring the ASID conversion informations, the ASID control section 42 sets the TLB necessity flag 43E of each ASID conversion information to "necessary" (step S43). The ASID control section 42 sets the actual ASID in the MMU 12 (step S44), and ends the processing operation.

Further, when the actual ASID is not used in the overlapped manner (NO at step S42), the ASID control section 42 does not execute the processing for setting ASID conversion information, and goes to step S44 to set actual ASID in the MMU 12. When the overlap flag of the ASID conversion information indicates "present", the ASID control section 42 determines that the actual ASID is overlapped, and when the overlap flag indicates "non-present", determines that the actual ASID is not overlapped.

Figure 10:
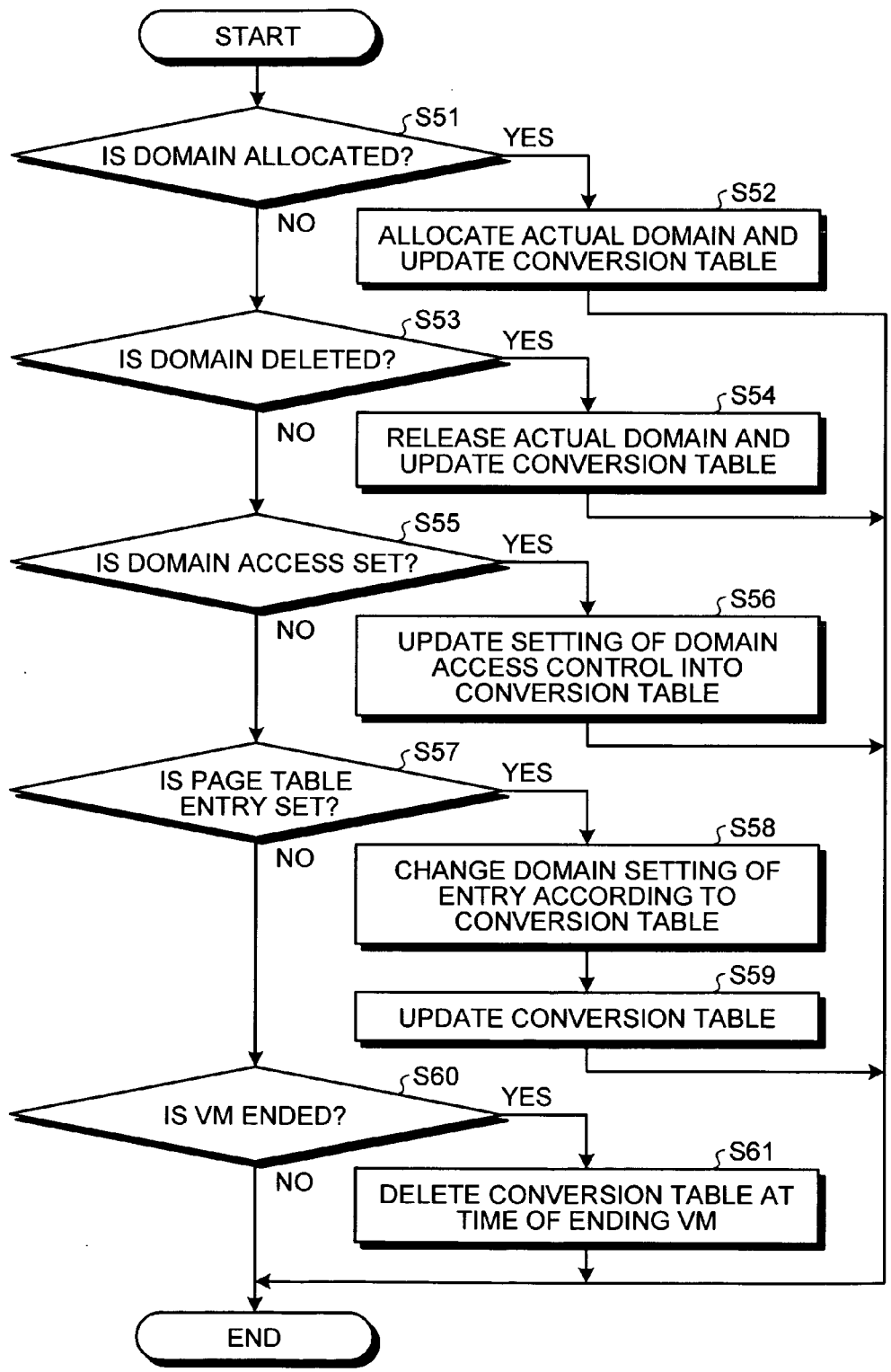
FIG. 10 is a flowchart illustrating a processing operation in a domain management section.

FIG. 10 is a flowchart illustrating a processing operation of the domain management section 45. The domain management section 45 is called by the domain setting section 32 of the VM 21, or when the VM 21 ends the process, the domain management section 45 is activated according to the calling operation from the VM management section, not illustrated. In FIG. 10, the domain management section 45 determines whether allocation of a new virtual domain is requested from the domain setting section 32 of the VM 21 (step S51). When the allocation of a new virtual domain is requested (YES at step S51), the domain management section 45 refers to entry contents of the actual domain use table 48, and allocates an actual domain that should correspond to the new virtual domain (step S52).

The domain management section 45 updates the domain conversion table 47 corresponding to the virtual domain (step S52), and ends the processing operation. The domain management section 45 refers to entry contents of the actual domain use table 48, and allocates a non-used actual domain if possible. Then, the domain management section 45 sets the in-use flags of actual domain of the actual domain use table 48 and the domain conversion table 47 to "in use", and adds the combination of VMID and the virtual domain as the virtual machine list 48D to the actual domain use table 48.

When all the actual domains are "in use", the domain management section 45 may allocate a non-overlapped actual domain, an actual domain whose TLB necessity flag 47F indicates "unnecessary", or an actual domain that is not used for the global region. When the allocated actual domain is overlapped, the domain management section 45 sets the overlap flag 48B of the actual domain in the actual domain use table 48 to "present", and sets the overlap flag 47E of the actual domain in the domain conversion table 47 to "present". Further, when the TLB necessity flag 47F of virtual domains other than the new virtual domain of the actual domain of the domain conversion table 47 indicates "necessary", the domain management section 45 sets the TLB necessity flag 47F of new virtual domain in the domain conversion table 47 to "necessary".

When the domain setting section 32 of the VM 21 specifies global or local, the domain management section 45 sets the global flag 47H or the local flag 47I of the domain conversion table 47 according to the request.

When the allocation of a new virtual domain is not requested (NO at step S51), the domain management section 45 determines whether deletion of a virtual domain is requested (step S53). When the deletion of a virtual domain is requested (YES at step S53), the domain management section 45 refers to entry contents of the domain conversion table 47, and releases the entry corresponding to the deleted virtual domain (step S54).

The domain management section 45 further updates the actual domain use table 48 corresponding to the virtual domain (step S54), and ends the processing operation. The domain management section 45 sets an actual domain of the domain conversion table 47 corresponding to the deleted virtual domain to an invalid value, and cancels setting of the in-use flag 47G (non-use). The domain management section 45 deletes combinations of VMID and virtual domain of entry of the actual domain corresponding to the deleted virtual domain in the actual domain use table 48, and when the number of a residual combination is one, it cancels the setting of the overlap flag 48B (none). When the number of a residual combination is one, the domain management section 45 cancels the setting of the overlap flag 47E of the virtual domain in the domain conversion table 47 corresponding to this combination (none).

When the deletion of a virtual domain is not requested (NO at step S53), the domain management section 45 determines whether setting of a domain access is requested (step S55). When the setting of the domain access is requested (YES at step S55), the domain management section 45 reads access setting for each virtual domain, updates the read setting of access control to the access setting 47D of the domain conversion table 47 (step S56), and ends the processing operation.

When the setting of a domain access is not requested (NO at step S55), the domain management section 45 determines whether setting of a page table entry by means of the domain setting section 32 of the VM 21 is requested (step S57). When the setting of the page table entry is requested (YES at step S57), the domain management section 45 acquires a domain number in the entry, and acquires an actual domain corresponding to the domain number (as a virtual domain number) from the domain conversion table 47. The domain management section 45 replaces the domain number of the page table entry by the actual domain (step S58). The domain management section 45 writes entry such that domain of the page table is replaced. Due to the conversion of the domain, consistency between a domain to be set in the MMU 12 and a domain of the page table entry is maintained.

The domain management section 45 acquires a global flag of the page table entry, and when the flag is set, it sets the global flag 47H of the virtual domain in the domain conversion table 47. When a flag is not set, the domain management section 45 sets the local flag 47I of the virtual domain in the domain conversion table 47 (step S59).

When the setting of the page table entry is not requested (NO at step S57), the domain management section 45 determines whether the end of VM is requested from the VM management section (step S60). When the end of VM is requested (YES at step S60), the domain management section 45 releases all virtual domains used by the VM 21 (step S61). The domain management section 45 deletes the domain conversion table 47 that manages all the virtual domains used by the VM 21 (step S61), and ends the processing operation. Further, when the end of VM is not requested (NO at step S60), the domain management section 45 ends the processing operation.

Figure 11:
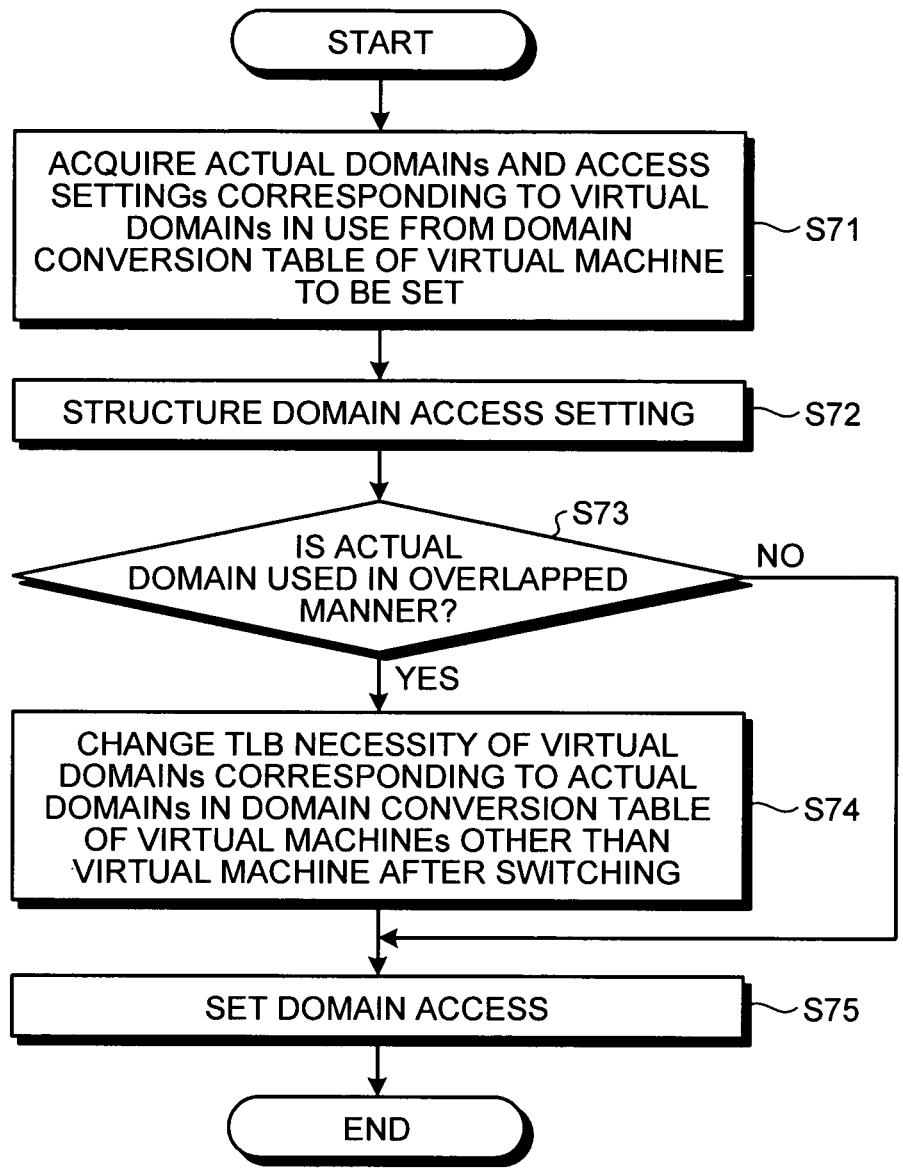
FIG. 11 is a flowchart illustrating a processing operation in a domain control section.

FIG. 11 is a flowchart illustrating a processing operation of the domain control section 46. When the domain control section 46 is called by the context switch control section 49, the VM 21 is transmitted to the domain control section 46 from the context switch control section 49. In FIG. 11, when the domain control section 46 is called by the context switch control section 49, the domain control section 46 acquires actual domains and access settings corresponding to VMID of the VM from the domain conversion table 47 (step S71). When the domain control section 46 acquires the actual domains and the access settings, it structures domain access setting for setting in the MMU 12 (step S72). The domain access setting requires settings of actual domains that is being used by the VM 21 and also actual domains that is not used by the VM 21. That is to say, the domain control section 46 sets the domain access to the actual domain being used by the VM 21 to accessibility, and sets the domain access to the actual domain that is not used by the VM 21 to unaccessibility.

The domain control section 46 refers to the domain conversion table 47, and determines whether actual domains corresponding to virtual domains whose access setting is other than unaccessibility is being used in an overlapped manner (step S73). When the actual domain is being used in the overlapped manner (YES at step S73), the domain control section 46 searches for VMID and virtual domain in the overlapped-use virtual machine list 48D corresponding to the actual domain registered in the actual domain use table 48. The domain control section 46 further acquires entries registered in the domain conversion table 47 for a combination of a VMID and a virtual domain different from the target VMID and the target virtual domain in the virtual machine list 48D (step S74). The domain control section 46 changes the TLB necessity flag 47F of each entry into "necessary" (step S74), and sets the domain access setting to the MMU 12 (step S75), so as to end the processing operation.

When the actual domains are not used in the overlapped manner (NO at step S73), the domain control section 46 goes to step S75 so as to set the domain access setting to the MMU 12.

Figure 12:
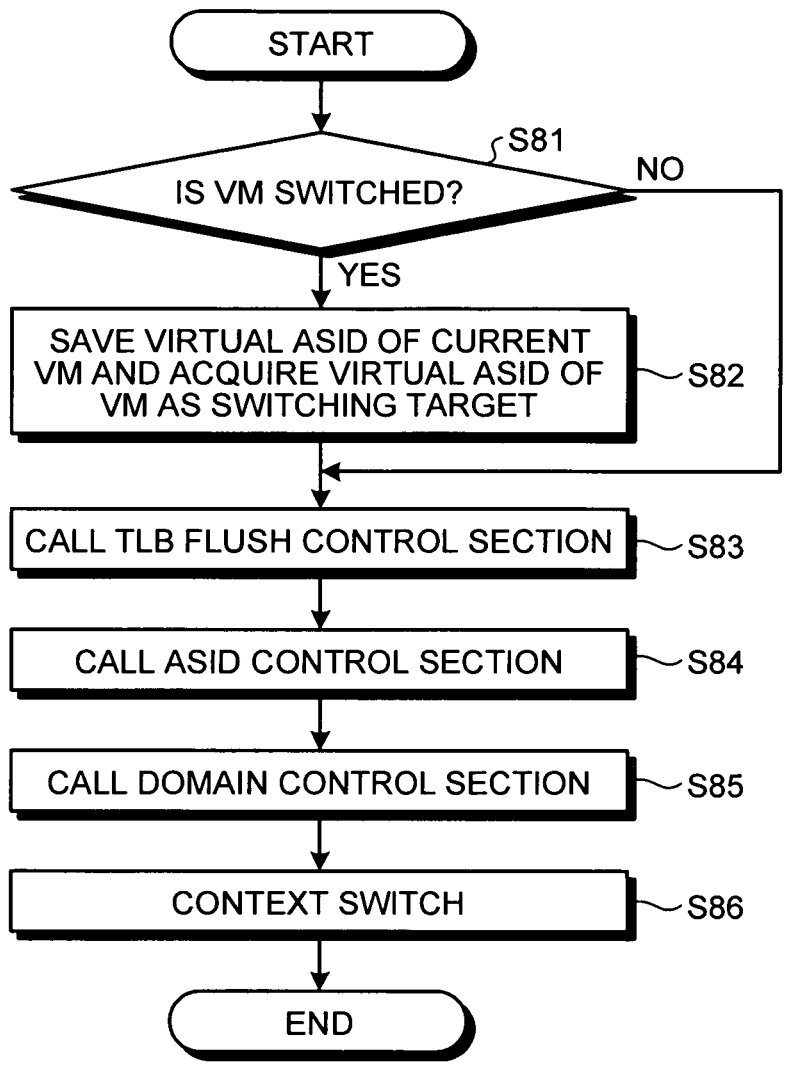
FIG. 12 a flowchart illustrating a processing operation in a context switch control section.

FIG. 12 is a flowchart illustrating a processing operation of the context switch control section 49. The context switch control section 49 is called with a virtual ASID as an argument by the ASID setting section 31 of the VM 21 or with VMID as an argument by the VM management section, not illustrated. In FIG. 12, when the context switch control section 49 is called by the VM management section, it determines whether the switching from the current VM 21 into a different VM 21 is performed (step S81). When the switching of the VM 21 is performed (YES at step S81), the context switch control section 49 saves virtual ASID of the current VM 21 into an ASID saving section of the VM 21, not illustrated. Further, the context switch control section 49 acquires the virtual ASID from the ASID saving section of the specified VM 21 as the switching target (step S82).

The context switch control section 49 determines whether TLB flush is necessary. When necessary, the context switch control section 49 calls the TLB flush control section 50 with the VM 21 and the virtual ASID as arguments in order to perform the TLB flush (step S83). After the context switch control section 49 returns from the TLB flush control section 50, it calls the ASID control section 42 with the VM 21 and the virtual ASID as arguments (step S84). The context switch control section 49 call the domain control section 46 with the VM 21 as a argument(step S85). The context switch control section 49 performs context switch (step S86), and ends the processing operation. The context switch replaces the register of the CPU 14 or replaces the page table that is used for converting a virtual address into a physical address.

When the VM switching is not performed (NO at step S81), the context switch control section 49 goes to step S83 in order to call the TLB flush control section 50. When the context switch control section 49 is called by the ASID setting section 31, it starts the processing from step S83.

Figure 13:
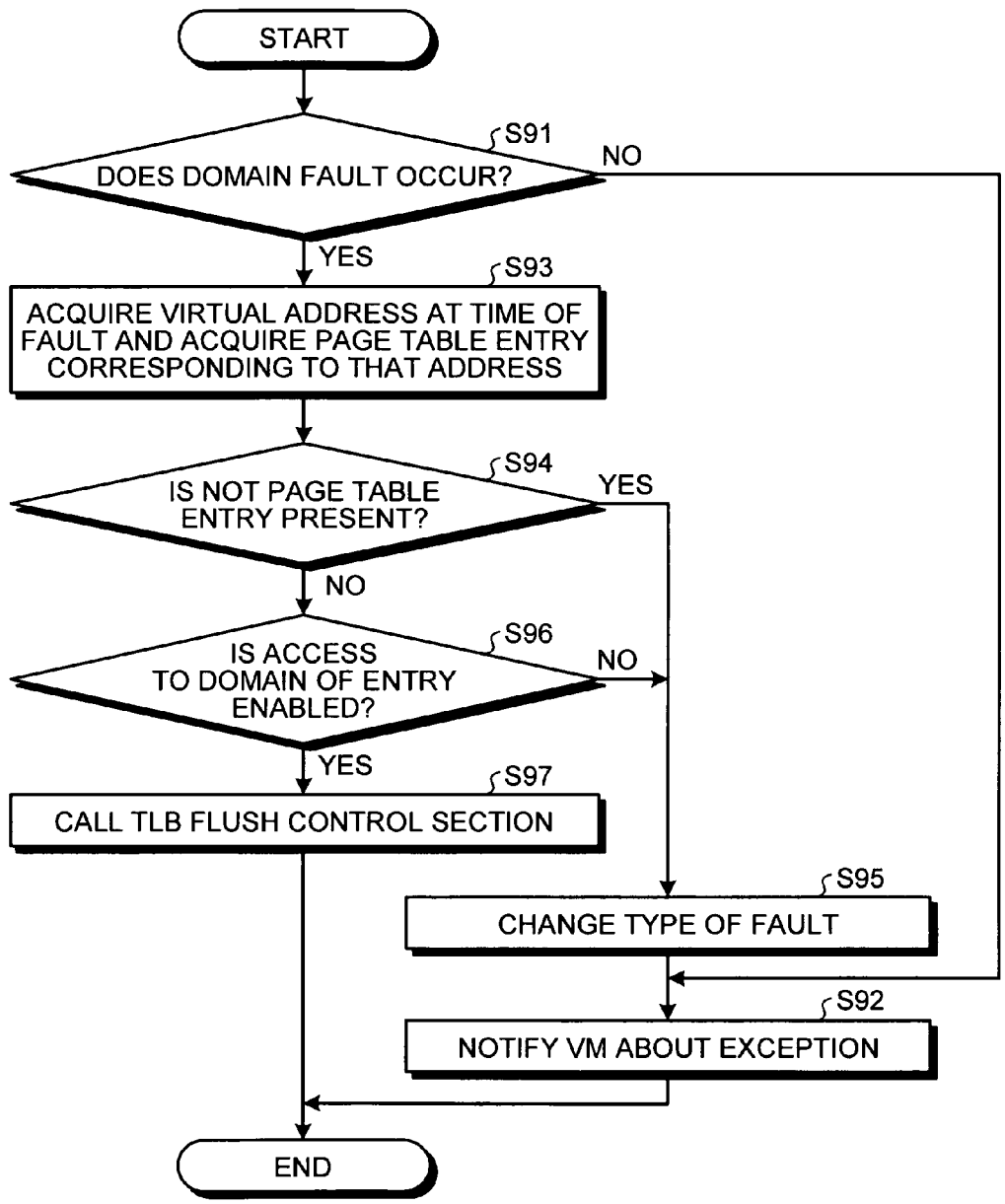
FIG. 13 is a flowchart illustrating a processing operation in an exception processing section.

FIG. 13 is a flowchart illustrating a processing operation of the exception processing section 51. The exception includes, for example, exception that occurs at the time of memory access because a memory to be accessed is not present or access right is not provided, and exception that occurs at the time of the operation of the CPU 14 because the division by 0 is tried to be performed or an undefined instruction is tried to be executed.

The exception processing section 51 executes a processing for the exception that occurs at the time of memory access when not the hypervisor 22 but the VM 21 operates. In FIG. 13, the exception processing section 51 checks a type of the exception and determines whether the exception is a domain fault (step S91). The domain fault is an exception that occurs when the domain access setting for a domain in the page table entry corresponding to a virtual address accessed by the VM 21 is unaccessibility.

When the exception is not the domain fault (NO at step S91), the exception processing section 51 notifies the VM 21 about the exception(step S92), and ends the processing operation. The VM 21 processes the exception based on the notified content.

When the exception is the domain fault (YES at step S91), the exception processing section 51 acquires a virtual address that is a cause of the fault, namely, a virtual address to which the VM 21 tries to access. The exception processing section 51 acquires a page table entry corresponding to that virtual address (step S93). In TLB entries, the number of a domain that is not used by the self VM 21 might exist, and since that domain is set to unaccessibility in the domain access setting, a domain fault that is not related to the self VM 21 occurs.

The exception processing section 51 determines whether the page table entry is not present (step S94). When the page table entry is not present (YES at step S94), the exception processing section 51 determines that the page table entry of another VM 21 is cached in the TLB 13 and the virtual address whose page table is not present is accessed. The exception processing section 51 changes the type of the exception into the page fault representing that a memory to be accessed is not present (step S95), and moves to step S92 in order to notify the VM 21 about the exception.

OS on the VM 21 which is notified about the exception determines that the OS cannot continue the processing and thus ends the processing of the OS, or OS that has a demand paging function executes a processing for allocating a new memory at a moment of the page fault. In the case of the demand paging, the OS determines whether a new memory is allocated to the virtual address according to the virtual address where the page fault occurs and cause of the page fault. When a memory that can be allocated is present, the page table is changed, and the processing is recovered from the exception so that the processing is restarted from the virtual address where the page fault occurs. The calling of the TLB flush control section 50 by the exception processing section 51 may be omitted. This is because the VM 21 that causes the fault does not prepare a page table for an access to a virtual address when a fault occurs.

When the page table entry is present (NO at step S94), the exception processing section 51 refers to a domain of the page table entry, and acquires its actual domain (step S96). The exception processing section 51 further acquires a virtual domain corresponding to the actual domain and VMID of the VM 21 operating at the time of the occurrence of the exception from the actual domain use table 48. The exception processing section 51 determines based on the access setting of the virtual domain whether a domain of the page table entry can be accessed (step S96).

When the domain of the entry cannot be accessed (NO at step S96), the exception processing section 51 goes to step S95 in order to change the type of the exception into the page fault. The case where the access is not enabled includes a case where the access setting of the virtual domain is unaccessibility, and a case of lack of an access right in the page table entry flag when the access setting of the virtual domain is setting according to a page table entry flag. The exception processing section 51 does not need a change in the exception in the case of unaccessibility, but changes the exception into access flag fault in the case of the lack of the access right. The exception processing section 51 then goes to step S92 in order to notify the VM 21 about the exception. For example, when the OS on the VM 21 is notified about the exception in kernel mode, the OS on the VM 21 determines that the processing cannot be further continued, and the OS panics, and the VM 21 thus ends. When the OS on the VM 21 is notified about the exception in user mode, the OS on the VM 21 sends a signal to the process executed in user mode and ends the process. The calling of the TLB flush control section 50 by the exception processing section 51 may be omitted.

When the domain of the entry can be accessed (YES at step S96), the exception processing section 51 calls the TLB flush control section 50 with the virtual address as a argument (step S97), and ends the processing operation. The TLB flush control section 50 is called because the TLB entry relating to the same virtual address of the other VM 21 as the VM 21 is cached in the TLB 13.

The exception processing section 51 restarts the VM 21 from a state before the exception occurs. The restart of the VM 21 is to try to again access to a virtual address that is a cause of the fault after the TLB flush control section 50 executes the TLB flush. Information about registers of the CPU 14 is restored to information before the occurrence of the exception, and the processing of the VM 21 is restarted. Concretely, the restart of the VM 21 can be realized by restoring program counter in registers.

The exception processing section 51 calls the TLB flush control section 50 with a virtual address as a argument, but since some TLB flush methods are present, the exception processing section 51 may call the TLB flush control section 50 with suitable parameters as arguments.

Figure 14:
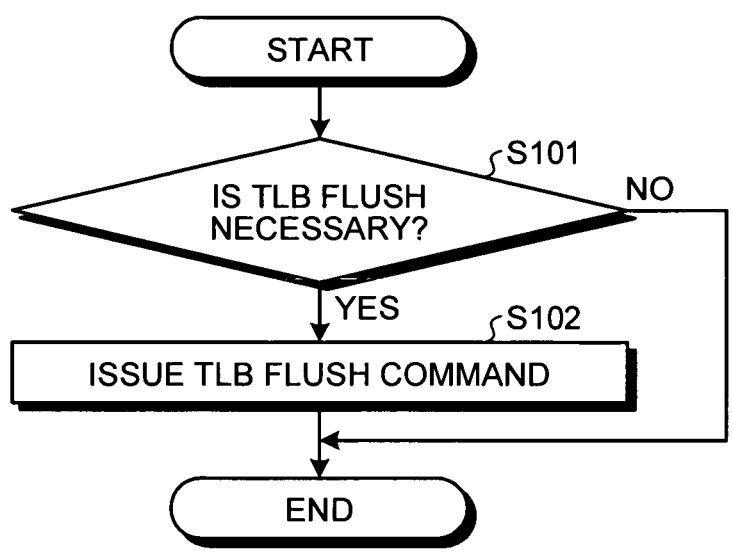
FIG. 14 is a flowchart illustrating a processing operation in a TLB flush control section.

FIG. 14 is a flowchart illustrating a processing operation of the TLB flush control section 50. The TLB flush control section 50 is called by the context switch control section 49 or the exception processing section 51. In FIG. 14, the TLB flush control section 50 determines whether the execution of the TLB flush is necessary (step S101). When the execution of the TLB flush is necessary (YES at step S101), the TLB flush control section 50 issues a TLB flush command (step S102), and ends the processing operation. Further, when the execution of the TLB flush is not necessary (NO at step S101), the TLB flush control section 50 ends the processing operation.

When the TLB flush control section 50 is called by the exception processing section 51, since a virtual address as a argument is specified, it determines that the execution of the TLB flush is necessary. The TLB flush control section 50 issues the TLB flush command using the virtual address.

When the TLB flush control section 50 is called by the context switch control section 49, VMID representing the VM 21 as the switching target and virtual ASID are specified. The TLB flush control section 50 determines based on the VMID of the VM 21 as the switching target and the virtual ASID whether the execution of the TLB flush is necessary. The TLB flush control section 50 extracts entries whose TLB necessity flag 47F indicates "necessary" from the domain conversion table 47 of the VM 21. When the extracted entries include entries whose global flag 47H is set, the TLB flush control section 50 determines that the execution of the TLB flush is necessary. Suppose that the same domain is used between the VMs 21, for example, the domain and global are set in a page table entry of a address A of a VM 1, and the page table entry is cached to the TLB 13. In this case, if the TLB flush control section 50 does not flush the TLB 13 and switches the VM 1 into a VM 2, the VM 2 can access to the address A using the page table entry remaining in the TLB 13. That is to say, memory spaces cannot be separated between the VMs 21. Therefore, when a page table entry whose global flag is set is present, the TLB flush control section 50 determines that the execution of the TLB flush is necessary.

When global flag of a page table entry is not set, the MMU 12 searches the TLB 13 using ASID. For this reason, when a page table entry whose global flag is not set is present, the TLB flush control section 50 does not determine that the execution of the TLB flush is necessary at this time point, and determines at the following time point.

When the TLB necessity flag of the virtual domain whose global flag is set indicates "unnecessary", the TLB flush control section 50 refers to the TLB necessity flag 43E of the virtual ASID in the ASID conversion table 43 of the VM 21. When the TLB necessity flag 43E indicates "necessary", the TLB flush control section 50 determines that the execution of the TLB flush is necessary for the virtual ASID. At this time, when the TLB flush control section 50 determines that the execution of the TLB flush is necessary, it changes the TLB necessity flag 43E from "necessary" into "unnecessary".

When the TLB necessity flag 47F of the virtual domain whose global flag is set indicates "necessary", the TLB flush control section 50 executes the flush of the entire TLB 13. When the determination is made that the TLB flush is necessary for the virtual ASID, the TLB flush control section 50 specifies actual ASID related to the virtual ASID so as to flush the TLB 13.

Since the TLB 13 can be flushed for an address, even when the TLB necessity flag 47F of the virtual domain whose global flag is set indicates "necessary", the TLB flush control section 50 can partially flush the TLB 13.

Also when the TLB flush control section 50 is called by the exception processing section 51, it can flush the TLB 13 for a virtual address, and also can flush the entire TLB 13. The TLB flush control section 50 can flush the TLB 13 for an actual ASID related to the virtual ASID of the VM 21.

In the first embodiment, only the minimum TLB flush is executed at the time of context switch, and when entries cached to the TLB 13 are butted, the TLB flush is executed in the exception processing. As a result, since the TLB flush can be delayed until the occurrence of exception, entries in the TLB 13 might be replaced during this delayed time. For this reason, as a result, unnecessary TLB flush can be eliminated. That is to say, in the first embodiment, because ASID and domain are virtualized and are exclusively used for each VM 21, even if the switching between a plurality of VMs 21 in a virtualized environment occurs, occurrence frequency of the TLB flush can be lowered.

[b] Second Embodiment

The memory management apparatus 1 according to a second embodiment is described below. The same components as those of the memory management apparatus 1 according to the first embodiment are denoted by the same reference symbols, and description of the overlapped components and operation is omitted. In the memory management apparatus 1 according to the second embodiment, when the TLB flush is executed for a virtual ASID in the TLB flush control section 50, an actual ASID for the virtual ASID is reallocated.

Figure 15:
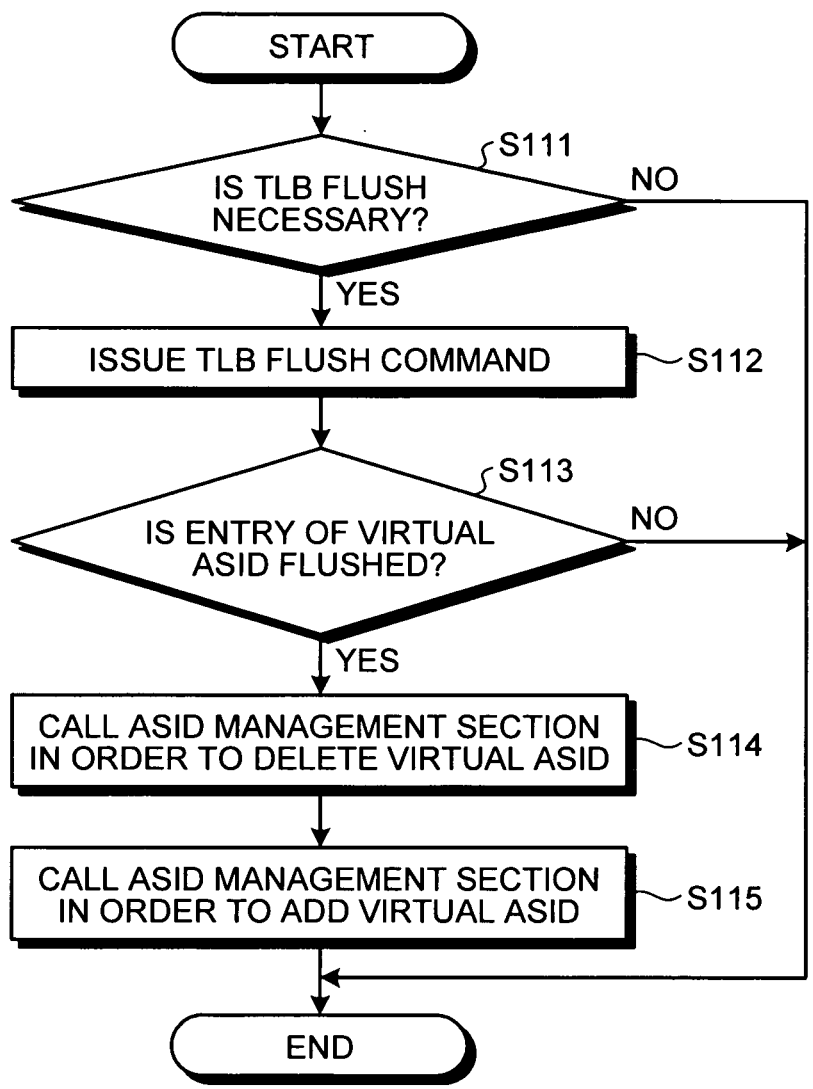
FIG. 15 is a flowchart illustrating a processing operation in the TLB flush control section according to a second embodiment.

FIG. 15 is a flowchart illustrating a processing operation of the TLB flush control section 50 according to the second embodiment. The TLB flush control section 50 is called by the context switch control section 49 or the exception processing section 51. In FIG. 15, the TLB flush control section 50 determines whether the execution of the TLB flush is necessary (step S111). When the execution of the TLB flush is necessary (YES at step S111), the TLB flush control section 50 issues a TLB flush command (step S112). When the execution of the TLB flush is not necessary (NO at step S111), the TLB flush control section 50 ends the processing operation.

The TLB flush control section 50 determines whether all entries of currently set virtual ASID of the VM 21 currently operating are flushed according to the issue of the TLB flush command (step S113). When all the entries of the currently set virtual ASID of the VM 21 currently operating are flushed (YES at step S113), the TLB flush control section 50 calls the ASID management section 41 in order to delete the virtual ASID of the VM 21 (step S114). The TLB flush control section 50 further calls the ASID management section 41 so as to add virtual ASID of the VM 21 (step S115), and ends the processing operation. As a result, when free actual ASID is present, the virtual ASID is changed to non-overlapped one.

When all entries of the currently set virtual ASID of the VM 21 currently operating is not flushed (NO at step S113), the TLB flush control section 50 ends the processing operation.

In the second embodiment, when actual ASID is used in an overlapped manner even if free actual ASID is present, the allocation of virtual ASID can be readjusted so that the free actual ASID can be used. For this reason, the frequency of the TLB flush can be further lowered.

[c] Third Embodiment

The memory management apparatus 1 according to a third embodiment is described below. The same components as those of the memory management apparatus 1 according to the first and second embodiments are denoted by the same reference symbols, and description of the overlapped components and operation is omitted. The memory management apparatus 1 according to the third embodiment does not delay the TLB flush in a single uniform way, but switches the TLB flush between a delay case and a non-delay case. It is considered that when the memory management apparatus 1 according to the first embodiment delays the TLB flush, the delayed TLB flush frequently occurs by means of the exception processing according to an overlap-use situation of ASID and domains. Therefore, in order to cope with such a situation, the TLB flush is not delayed in a single uniform way, and a determination is made whether the TLB flush is delayed according to a condition.

Figure 16:
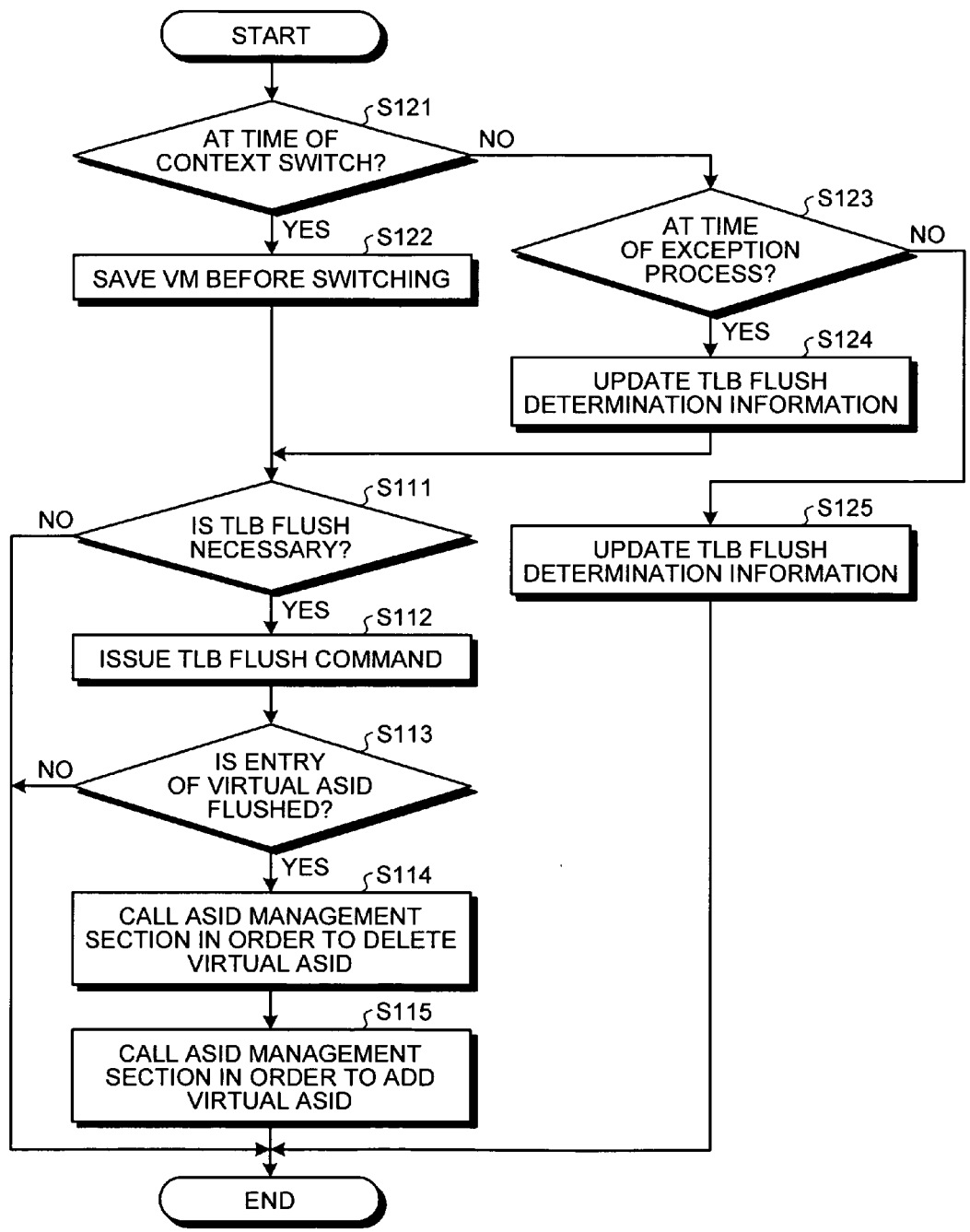
FIG. 16 is a flowchart illustrating a processing operation in the TLB flush control section according to a third embodiment.

FIG. 16 is a flowchart illustrating a processing operation of the TLB flush control section 50 according to the third embodiment. In FIG. 16, the TLB flush control section 50 determines whether it is called by the context switch control section 49, namely, at the time of context switch (step S121). At the time of the context switch (YES at step S121), the TLB flush control section 50 saves the virtual ASID and VMID representing the VM 21 as the switching source (step S122). When the VM 21 is not switched, VMID is not saved. After step S122, the TLB flush control section 50 goes to steps S111 to S115 in order to determine whether the TLB flush is necessary.

When the TLB flush control section 50 is not called by the context switch control section 49 (NO at step S121), the TLB flush control section 50 determines whether it is called by the exception processing section 51, namely, at the time of the exception processing (step S123). At the time of the exception processing (YES at step S123), the TLB flush control section 50 acquires a virtual domain from a page table entry to which a virtual address where exception occurs belongs, and a virtual ASID in the case where global flag of the page table entry is not set. This virtual domain is a virtual domain that makes a combination with VMID of the VM 21 operating at the time of the occurrence of the exception with reference to the actual domain use table 48 based on a domain number as an actual domain included in the corresponding page table entry acquired from the virtual address. Further, the virtual ASID is acquired from an ASID saving section, not illustrated, of each VM 21.

Figure 17:
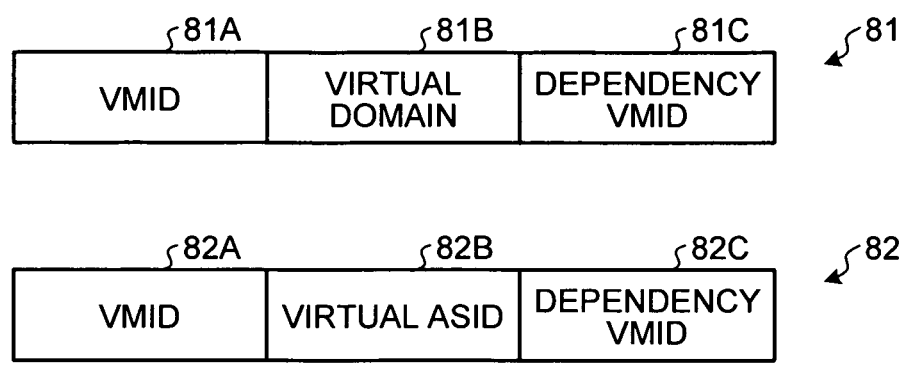
FIG. 17 is an explanatory diagram illustrating one example of TLB flush determination information.

The TLB flush control section 50 updates TLB flush determination information (step S124). FIG. 17 is an explanatory diagram illustrating one example of the TLB flush determination information. FIG. 17 illustrates the TLB flush determination information in the case of domain and the TLB flush determination information in the case of ASID. The TLB flush determination information 81 in the case of domain, namely, a domain dependency information 81 is set when a region which is target for TLB flush is global, and has a VMID 81A, a virtual domain 81B and a dependency VMID 81C. The VMID 81A is ID of the VM 21 for executing the TLB flush, namely, the VM 21 that causes a fault for activating the processing in the exception processing section 51. The virtual domain 81B is a domain number of a region to be subject to the TLB flush. The dependency VMID 81C is ID of the VM 21 that is saved at the time of the context switch.

The TLB flush determination information 82 in the case of ASID, namely, an ASID dependency information 82 is set when a region that is target for the TLB flush is local, and has a VMID 82A, a virtual ASID 82B and a dependency VMID 82C. The VMID 82A is ID of the VM 21 at the time of executing the TLB flush. The virtual ASID 82B is ASID of a region to be subject to the TLB flush. The dependency VMID 82C is ID of the VM 21 that is saved at the time of context switch.

When the TLB flush control section 50 is called by the ASID management section 41 with a virtual ASID that is not used in an overlapped manner as an argument, it deletes VMID from the dependency VMID 82C if corresponding virtual ASID is present in the TLB flush determination information 82. The TLB flush control section 50 searches the TLB flush determination information 82 for a term of the VM 21 of the virtual ASID that is set to the dependency VMID 82C. Further, the TLB flush control section 50 acquires actual ASID corresponding to the virtual ASID 82B of the TLB flush determination information 82 as the searched result from the ASID conversion table 43 of the VMID 82A of the TLB flush determination information 82 as the searched result. Further, the TLB flush control section 50 acquires the actual ASID of the virtual ASID as an argument from the ASID conversion table 43 of the VM 21 of the virtual ASID as an argument, and when these actual ASIDs matches, it determines that corresponding virtual ASID is present. When corresponding virtual ASID is not present, the TLB flush control section 50 does nothing.

When the TLB flush control section 50 is called by the domain management section 45 with a virtual domain that is not used, it deletes VMID form the dependency VMID 81C if corresponding virtual domain is present in the TLB flush determination information 81. The TLB flush control section 50 can delete a VMID of the the dependency VMID 81C in FIG. 17 when all virtual domains of the VMID are deleted. For this reason, it searches for a term where the VM 21 of the virtual domain as an argument is set to the dependency VMID. Only when the TLB flush control section 50 confirms that all virtual domains of the VMID of the VM 21 are deleted based on the domain conversion table 47, it deletes the VMID from the dependency VMID 81C of the entry including that dependency VMID. The TLB flush control section 50 is called by the domain management section 45 with a virtual domain. However, the TLB flush control section 50 may be called by the domain management section 45 at the time of VM deletion in a format of all virtual domains used by the VM 21, and deletes VMID of the VM 21 from the dependency VMID 81C of the term including the dependency VMID. As a result, the processing becomes smoother than the case where each virtual domain used by the VM 21 is repeatedly called.

Therefore, when the TLB flush control section 50 updates the TLB flush determination information (step S124), it goes to steps S111 to S115 in order to determine whether the TLB flush is necessary.

When the TLB flush control section 50 is not called by the exception processing section 50 (NO at step S123), the TLB flush control section 50 updates the TLB flush determination information (step S125), and ends the processing operation.

When being called by the ASID management section 41 and the domain management section 45, the TLB flush control section 50 ends the process. When being called by the context switch control section 49, the TLB flush control section 50 changes the determination of the TLB flush.

The TLB flush control section 50 acquires TLB flush determination information of VMID of the VM 21 of switching target. When the acquired TLB flush determination information includes domain dependency information and a term "dependency VMID" of the dependency information includes dependency information to which VMID representing the VM 21 before switching is set, the TLB flush control section 50 determines that the TLB flush for a region of the virtual domain indicated by the term "virtual domain" of the dependency information is "necessary".

When the acquired TLB flush determination information includes the dependency information of ASID, the TLB flush control section 50 determines whether the term "dependency VMID" of the dependency information includes dependency information in which VMID representing the VM 21 before switching is set. When the dependency information is present, the TLB flush control section 50 acquires an actual ASID of the virtual ASID illustrated in the term "virtual ASID" of the dependency information from ASID conversion information that is related to VMID illustrated in the term "dependency VMID" of the dependency information and is registered in the ASID conversion table 43. As a result, the actual ASID corresponding to the virtual ASID of the VM (dependency VMID) before switching can be obtained.

The TLB flush control section 50 acquires actual ASID from the ASID conversion table 43 for the virtual ASID of the dependency information of ASID, and when this acquired actual ASID matches with the actual ASID of dependency VMID, it determines that the TLB flush is necessary for the actual ASID. The virtual ASID in the dependency information of ASID is limited to only virtual ASID with VMID representing the VM 21 before switching that is set in the term "dependency VMID".

The TLB flush method of the domain regions is not described here, but a memory region of each domain is recorded at the time of setting the page table entry in the domain management section 45. Further, in the TLB flush control section 50, the recorded memory region is specified and the command of the TLB flush is executed so that the TLB flush can be executed. Besides this method, the occurrence frequency of the TLB flush is recorded, and a determination can be made whether the TLB flush is delayed according to the occurrence frequency. The determination as to whether the TLB flush is delayed is not limited to this.

In the third embodiment, when the delay of the TLB flush does not produce an effect, the TLB flush can be executed at the time of context switch. As a result, the present invention can cope with a defect caused by repetition of the exception processing due to delay.

The third embodiment described the domain dependency information 81 and the ASID dependency information 82 as the TLB flush determination information, so the processing for setting dependency information according to global or local is executed. However, only when the setting of a region target for the TLB flush is global, the processing for setting dependency information may be executed.

In the third embodiment, actual ASID is acquired from the ASID conversion table 43 for virtual ASID of the ASID dependency information 82, and when the acquired actual ASID matches with actual ASID corresponding to the virtual ASID of dependency VMID, the determination is made that the execution of the TLB flush is necessary for the actual ASID. However, the ASID conversion information, in which the actual ASID whose value is the same as actual ASID corresponding to the virtual ASID of the dependency VMID is set, is checked against the ASID conversion table 43, and the determination may be made whether the TLB flush is necessary.

[d] Fourth Embodiment

The memory management apparatus 1 according to a fourth embodiment is described below. The same components as those of the memory management apparatus 1 according to the first embodiment are denoted by the same reference symbols, and description of the overlapped components and operation is omitted. The memory management apparatus 1 according to the fourth embodiment uses characteristics of the VM 21 and realizes allocation of actual ASID and actual domains.

The allocation of actual ASID is described first. Parameters described below may be specified by the VM 21, or may be prepared in the hypervisor 22. When the parameters are specified by the VM 21, a hyper call or the like is used. A ratio of a number of usable virtual ASIDs is set for the VM 21. Due to the ratio, the number of usable virtual ASIDs fluctuates according to the number of the operating VMs 21.

When the VM 21 that requests allocation of virtual ASID uses a larger number of actual ASID than the ratio at the time of allocation of virtual ASID, the ASID management section 41 allocates actual ASID used in an overlapped manner. When the number of actual ASID that the VM 21 uses is smaller than the ratio, the ASID management section 41 searches for the VM 21 whose the number of actual ASID exceeds the ratio at most, and searches for a virtual ASID that is not overlapped from among the virtual ASIDs of this VM 21, so as to release an actual ASID corresponding to the virtual ASID. The virtual ASID is related to an actual ASID other than the released actual ASID. At this time, the actual ASID is necessarily used in an overlapped manner. In this case, the ASID management section 41 sets the TLB necessity flag related to the actual ASID to "necessary".

The release of an actual ASID is described below. The ASID conversion table 43 extends so as to be capable of recording use frequency. As to the use frequency, addition is performed at the time of switching by means of the TLB flush control section 50. When virtual ASID whose use frequency is high is overlapped, accordingly the possibility of the TLB flush becomes high. For this reason, virtual ASID to be overlapped whose use frequency is lower is selected. When virtual ASID whose use frequency is the lowest is not overlapped, this virtual ASID is selected, and when not, non-overlapped virtual ASID whose use frequency is the second-lowest is searched for. Relation to overlapped virtual ASID can be changed until the overlap of virtual ASID whose use frequency is low is eliminated. The TLB necessity flag of virtual ASID whose relation to actual ASID is changed is changed into "necessary".

The ASID conversion table 43 extends so as to be capable of recording priority. A control is made so that virtual ASID whose priority is low is overlapped and virtual ASID whose priority is high is not overlapped. When actual ASID corresponding to virtual ASID to be overlapped is determined, the determination is limited to the virtual ASID in the VM 21, or virtual ASIDs of all the VMs 21 may be target for the determination.

These methods for releasing actual ASID can also be used for the allocation of ASID. The allocation of actual ASID can be controlled according to the use frequency or the priority regardless of the ratio of the number of virtual ASID of the VM 21.

Virtual ASID whose priority is low can be overlapped even if free actual ASID is present. The allocation of actual domain is described below. Since a domain number is set in an entry of the page table, it is not easy to change an actual domain of the VM 21. To change an actual domain means to change the domain number of the page table entry. The same domain number can be set in many page table entries. That is to say, when an actual domain is changed, all the page table entries with that domain number must be changed. Further, the TLB 13 must be flushed. For this reason, the relation between virtual domain and actual domain is not changed.

A method for determining a virtual domain to be overlapped without readjusting allocation of actual domain is described below. Permission or non-permission of overlap is set for the VM 21. This may be set in a form of a flag or priority. In the case of the priority, a virtual domain of the VM 21 whose priority is the lowest is overlapped. A use memory region is set for the VM 21. The overlap of this memory region is checked, and the VM 21 whose memory region is greatly overlapped is made to overlap with the virtual domain. What memory region is greatly overlapped means that the TLB flush easily occurs in the switching between the VMs 21. When the actual domain is overlapped, a actual domain becomes free. A free actual domain can be effectively used as actual domain usable for another VM 21. That is to say, the overlap that allows the TLB flush control section 50 to determine that the TLB flush is necessary is caused between the VMs 21 where the memory region greatly overlaps. A use memory region is set for each virtual domain, so that the overlap can be determined for each virtual domain.

The VM 21 whose number of used virtual ASIDs is small is overlapped with an actual domain. The VM 21 whose number of used virtual ASIDs is small means the VM 21 whose number of used virtual ASIDs is smaller than a value obtained by dividing a maximum number of ASIDs by the number of VMs where actual domains overlap. Not all the VMs 21 use a plurality of ASID, and the VMs 21 that use only one ASID are present. Therefore, when such a VM 21 is assumed, the VM 21 whose number of used ASIDs is smaller is selected. The small number of virtual ASIDs means that a possibility that ASIDs overlap is low, and a possibility such that the TLB flush can be repressed is high. An actual domain can be actively overlapped between the VMs 21 that can exclusively use ASIDs in advance. For example, an actual domain can be overlapped between the VMs 21 whose OS uses only one ASID, if ASIDs are not overlapped. Similarly to ASID, domain can also be overlapped even if they are free at the time of allocation.

In the fourth embodiment, ASID and domain can be allocated efficiently, and thus TLB flush can be eliminated.

[e] Fifth Embodiment

The memory management apparatus 1 according to a fifth embodiment is described below. The same components as those of the memory management apparatus 1 according to the first embodiment are denoted by the same reference symbols, and description of the overlapped components and operation is omitted. The memory management apparatus 1 according to the fifth embodiment manages the memory use condition of the VM 21, and overlaps virtual ASID if memory region is not overlapped. The memory management apparatus 1 manages a use condition of a global region in each VM 21 (global region use condition) and a use condition of each process in the VM 21 (local region use condition).

The use condition of each process corresponds to a use condition of each virtual ASID. When a memory region is represented by 2 MB and the use/non-use of the memory region is represented by 1 bit, memory of 256 bytes is necessary in a memory space of 4 GB. That is to say, for each VM 21, a memory having 256 bytes for a global region and the number of processes×256 bytes is necessary. The memory can be managed without distinction of global and local. At this time, the use/non-use of the memory region can be indicated by a counter.

The global region use condition of the VM 21 is created at the time of creating VM by means of the VM management section, and is deleted at the time of ending the VM by means of the VM management section. The local region use condition is created at the time of allocating ASID by means of the ASID management section 41, and is deleted at the time of deleting the ASID by means of the ASID management section 41. The global region use condition and the local region use condition are updated at the time of setting page table entry of the domain management section 45.

With these use conditions, when actual ASID is allocated in the ASID management section 41, virtual ASID of which use memory region is not overlapped is found, and the virtual ASID of which the use memory region is not overlapped and actual ASID corresponding to the virtual ASID can be used in an overlapped manner. The ASID management section 41 compares a local region use condition of virtual ASID target for allocation of actual ASID with a local region use condition other than the target, and searches for virtual ASID of a non-overlapped use memory region. The ASID management section 41 refers to the ASID conversion table 43 based on VMID and virtual ASID of the local region use condition as the searched result, and searches for actual ASID to be used in an overlapped manner. Further, the actual ASID is related to virtual ASID target for the allocation, and the actual ASID and the virtual ASID are registered in the ASID conversion table 43. The virtual ASID target for the allocation corresponds to ID specified at the time when the ASID management section 41 is called by the ASID setting section 31 operating on the VM 21. The use conditions can be set by hyper call or the like at the time of creating VM or creating a process of OS in the VM 21.

In the fifth embodiment, since virtual ASID with less overlap of a memory region is overlapped, the possibility of the TLB flush is reduced.

[f] Sixth Embodiment

The memory management apparatus 1 according to a sixth embodiment is described below. The same components as those of the memory management apparatus 1 according to the fifth embodiment are denoted by the same reference symbols, and description of the overlapped components and operation is omitted. The memory management apparatus 1 according to the sixth embodiment utilizes the use condition in the fifth embodiment, and operates the VM 21 that uses only a memory region unused by the other VMs 21. At the time of context switching with that VM 21, the TLB flush is prevented.

When the VM management section creates the VM 21, a memory region that is available for a size required by the VM 21 is searched for. When the free memory region is present, a program of the VM 21 is converted so that the program is executed in that region, and the program is copied to the memory region. The program of the VM 21 corresponds to a program that executes on the VM 21, and this program can be executed even when it is arranged on any address. To convert the program of the VM 21 so that the program is executed on the region means to convert an address at the time of arranging in actual memory. A page table is created so that the VM 21 can access to that memory region, and the VM 21 is operated. The free memory region means a region that is not used by any VM 21. This region is determined after the global region use condition and the local region use condition of all the VMs 21 are taken into consideration. Further, since the address of a free memory region is likely to be changed in each case, the program of the VM 21 is created in a re-entrant form. The re-entrant corresponds to a program that is created so as to be executed even when it is arranged in any address. Therefore, the re-entrant can be applied to a VM 21 that executes only one process, and thus the switching between the VM 21 can be performed at a high speed.

In the sixth embodiment, the page table composing all the virtual addresses is provided with a conversion entry of the memory region of this VM 21, so that the page table does not have to be rearranged at the time of context switch, thereby achieving higher speed.

The first to sixth embodiments described the case of application to an environment of single CPU 14 as an example, but it goes without saying that the similar effect can also be produced under an environment of a multiprocessor with a plurality of CPUs 14. At this time, the above-described constitution is structured for each CPU 14.

The respective components of the respective sections illustrated in the drawings do not have to be physically constituted as illustrated in the drawings. That is to say, concrete distribution and integration forms of the respective sections are not limited to those illustrated in the drawings, and all or some of them can be mechanically or physically distributed and integrated in any unit according to various loads and use conditions.

Further, it goes without saying that all or any part of various processing in the respective apparatuses may be executed on a microcomputer such as CPU (Central Processing Unit), MPU (Micro Processing Unit), MCU (Micro Controller Unit)), or a program that is analyzed and executed on the CPU (or the microcomputer such as MPU or MCU), or hardware using a wired logic.

In one mode of the memory management apparatus of the subject application, even when a plurality of virtualized environments operates, the TLB flush can be repressed to a level equivalent to that at a non-virtualized situation without changing the control in the virtualized environments as much as possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it may be understood that the various changes, substitutions, and alterations could be made hereto without departing from the spirit and scope of the invention.

What is claimed is:
1. A memory management apparatus including:
   a region identification information management unit that relates virtual region identification information identifying a region in a memory to be allocated for a program executed in a virtualized environment to actual region identification information identifying a region in a memory to be allocated for a virtualized environment where the program is executed in each virtualized environment so as to manage respective identification information;

an overlap determining unit that determines whether the actual region identification information is allocated for a plurality of virtualized environments in an overlapped manner;

an overlap region management unit that, when the overlap determining unit determines that the actual region identification information is allocated for the plurality of virtualized environments in the overlapped manner, manages, for each virtualized environment, identification information that includes, the virtual region identification information and actual region identification information of the virtualized environment corresponding with overlap information representing an overlap, the overlap corresponding with the actual region identification information; and a TLB control unit that reads, when a virtualized environment as a switching source to which execution time is allocated is switched into a virtualized environment as a switching target, the actual region identification information allocated for the virtualized environment of the switching target from the region identification information management section, determines whether the read actual region identification information is allocated for the plurality of virtualized environments in the overlapped manner with reference to the overlap information in the overlap region management unit, and sets actual region identification information in the read actual region identification information determined as being allocated in the overlap manner as a target for a TLB process.

2. The memory management apparatus according to claim 1, comprising:

a domain management section unit that relates virtual domains included in the virtual region identification information to actual domains included in the actual region identification information in the region identification information management unit in each of the virtualized environments, wherein the TLB control unit includes:

a domain control unit that sets a domain access based on the relation of the domains at the time of an operation in the virtualized environment, and when an access to a domain used to be overlapped with another virtualized environment is enabled, retains necessity of TLB flush as the TLB processing based on the setting of the domain access;

a TLB flush control unit that determines whether the TLB flush is necessary at the time of switching the virtualized environment; and an exception processing unit that executes the TLB flush when the access to the domain used to be overlapped with another virtualized environment is enabled at a time of occurrence of an exception, and delays the TLB flush when the access to the domain used to be overlapped with another virtualized environment at the time of the occurrence of the exception is disabled.

3. The memory management apparatus according to claim 2, comprising:

an ASID management unit that relates virtual ASID included in the virtual region identification information to actual ASID included in the actual region identification information in the region identification information management unit for each of the virtualized environments, and wherein the TLB control unit has an ASID control unit that retains necessity of the TLB flush, when ASID to be used at the time of an operation in the virtualized environment is overlapped with another virtualized environment.

4. The memory management apparatus according to claim 3, wherein when the virtual ASID of the virtualized environment is newly related to actual ASID, the ASID management unit changes the relation between the ASIDs that is already done.

5. The memory management apparatus according to claim 3, wherein the TLB flush control unit instructs the ASID management unit to change the relation of the ASID determined being subject to the TLB flush.

6. The memory management apparatus according to claim 3, wherein the TLB flush control unit retains ASID and a domain at the time of executing the TLB flush, and uses the retained ASID and domain for determination of the TLB flush.

7. The memory management apparatus according to claim 6, wherein when the ASID is not used in the overlapped manner, the ASID management unit posts this ASID to the TLB flush control unit, and when a domain is not used, the domain management unit posts this domain to the TLB flush control unit.

8. The memory management apparatus according to claim 2, wherein the exception processing unit converts the exception into exception that can be posed to the virtualized environment at the time of occurrence of the exception.

9. A memory management apparatus including:

a processor; and a memory, wherein the processor executes:

relating virtual region identification information identifying a region in the memory to be allocated for a program executed in a virtualized environment to actual region identification information identifying a region in the memory to be allocated for a virtualized environment where the program is executed in each virtualized environment so as to manage respective identification information;

determining whether the actual region identification information is allocated for a plurality of virtualized environments in an overlapped manner;

managing, when determining that the actual region identification information is allocated for the plurality of virtualized environments in the overlapped manner, for each virtualized environment, identification information that includes, the virtual region identification information and actual region identification information of the virtualized environment corresponding with overlap information representing an overlap the overlap corresponding with the actual region identification information; and reading, when a virtualized environment as a switching source to which execution time is allocated is switched into a virtualized environment as a switching target, the actual region identification information allocated for the virtualized environment of the switching target, determining whether the read actual region identification information is allocated for the plurality of virtualized environments in the overlapped manner with reference to the overlap information, and setting actual region identification information in the read actual region identification information determined as being allocated in the overlap manner as a target for a TLB process.

10. A memory management method, comprising:

relating virtual region identification information identifying a region in a memory to be allocated for a program executed in a virtualized environment to actual region identification information identifying a region in the memory to be allocated for a virtualized environment where the program is executed in each virtualized environment so as to manage respective identification information;

determining whether the actual region identification information is allocated for a plurality of virtualized environments in an overlapped manner;

managing, when determining that the actual region identification information is allocated for the plurality of virtualized environments in the overlapped manner, for each virtualized environment, identification information that includes, the virtual region identification information and actual region identification information of the virtualized environment corresponding with overlap information representing an overlap, the overlap corresponding with the actual region identification information; and reading, when a virtualized environment as a switching source to which execution time is allocated is switched into a virtualized environment as a switching target, the actual region identification information allocated for the virtualized environment of the switching target, determining whether the read actual region identification information is allocated for the plurality of virtualized environments in the overlapped manner with reference to the overlap information, and setting actual region identification information in the read actual region identification information determined as being allocated in the overlap manner as a target for a TLB process.

11. A non-transitory computer readable storage medium having stored therein a memory management program causing a computer to execute a process comprising:

relating virtual region identification information identifying a region in a memory to be allocated for a program executed in a virtualized environment to actual region identification information identifying a region in the memory to be allocated for a virtualized environment where the program is executed in each virtualized environment so as to manage respective identification information;

determining whether the actual region identification information is allocated for a plurality of virtualized environments in an overlapped manner;

managing, when determining that the actual region identification information is allocated for the plurality of virtualized environments in the overlapped manner, for each virtualized environment, identification information that includes, the virtual region identification information and actual region identification information of the virtualized environment corresponding with overlap information representing an overlap, the overlap corresponding with the actual region identification information; and reading, when a virtualized environment as a switching source to which execution time is allocated is switched into a virtualized environment as a switching target, the actual region identification information allocated for the virtualized environment of the switching target, determining whether the read actual region identification information is allocated for the plurality of virtualized environments in the overlapped manner with reference to the overlap information, and setting actual region identification information in the read actual region identification information determined as being allocated in the overlap manner as a target for a TLB process.

* * * * *

UNITED STATES PATENT AND TRADEMARK OFFICE
CERTIFICATE OF CORRECTION

| | | |
|---|---|---|
| PATENT NO. | : 8,954,709 B2 | Page 1 of 1 |
| APPLICATION NO. | : 12/929943 | |
| DATED | : February 10, 2015 | |
| INVENTOR(S) | : Naoki Nishiguchi et al. | |

It is certified that error appears in the above-identified patent and that said Letters Patent is hereby corrected as shown below:

In the Claims

Column 24, line 58, in claim 9, delete "overlap" (Second Occurrence) and insert -- overlap, --, therefor.

Signed and Sealed this
Seventh Day of July, 2015

Michelle K. Lee
*Director of the United States Patent and Trademark Office*